United States Patent [19]
Morioka et al.

[11] Patent Number: 6,023,360
[45] Date of Patent: Feb. 8, 2000

[54] MULTIPLE-CHANNEL ALL-OPTICAL TDM-WDM CONVERTER AND MULTIPLE-CHANNEL ALL-OPTICAL TDM DEMULTIPLEXER

[75] Inventors: Toshio Morioka; Hidehiko Takara; Masatoshi Saruwatari, all of Yokosuka, Japan

[73] Assignee: Nippon Telegraph and Telephone Corporation, Tokyo, Japan

[21] Appl. No.: 08/892,474

[22] Filed: Jul. 14, 1997

Related U.S. Application Data

[63] Continuation of application No. 08/514,919, Aug. 14, 1995, abandoned.

[30] Foreign Application Priority Data

Aug. 15, 1994 [JP] Japan ................................ 6-191645

[51] Int. Cl.[7] .............................. H04J 14/02; H04J 14/08
[52] U.S. Cl. ......................... 359/123; 359/138; 359/140; 359/156
[58] Field of Search .................................. 359/122, 123, 359/124, 132, 135, 138, 140, 156, 180

[56] References Cited

U.S. PATENT DOCUMENTS

| | | | |
|---|---|---|---|
| 5,357,359 | 10/1994 | Uchiyama et al. | 359/123 |
| 5,457,559 | 10/1995 | Saito et al. | 359/135 |

FOREIGN PATENT DOCUMENTS

| | | | |
|---|---|---|---|
| 0090696 | 4/1989 | Japan | 359/123 |

OTHER PUBLICATIONS

T. Morioka et al., "Polarisation–independent 100 Gbit/s all–optical Demultiplexer Using Four–wave Mixing in a Polarisation–maintaining Fibre Loop," Electronics Letters, vol. 30, No. 7, pp. 591–592 (Mar. 31, 1994).

P.A. Andrekson et al., "16 Gbit/s All–Optical Demultiplexing Using Four–Wave Mixing," Electronics Letters, vol. 27, No. 11, pp. 922–924 (May 23, 1991).

T. Morioka et al., "Ultrafast Reflective Optical Kerr Demultiplexer Using Polarisation Rotation Mirror," Electronics Letters, vol. 28, No. 6, pp. 521–522 (Mar. 12, 1992).

T. Morioka et al., "Ultrafast Polarisation–independent Optical Demultiplexer Using Optical Carrier Frequency Shift Through Crossphase Modulation," Electronics Letter, vol. 28, No. 11, pp. 1070–1072 (May 21, 1992).

M.A. Summerfield et al., All–optical TDM to WDM Conversion in a Semiconductor Optical Amplifier, Electronics Letters, vol. 30, No. 3, pp. 255–256 (Feb. 3, 1994).

(List continued on next page.)

*Primary Examiner*—Leslie Pascal
*Attorney, Agent, or Firm*—Finnegan, Henderson, Farabow, Garrett & Dunner, L.L.P.

[57] ABSTRACT

A multiple-channel all-optical TDM-WDM converter and multiple-channel all-optical TDM demultiplexer which is able to simultaneously and spatially separate optical signal pulse trains of each channel from a TDM optical signal pulse train is structured without using a multistage-structure constitution. A control optical source 10 generates a control optical pulse train containing N optical frequencies, which is synchronous with optical signal pulse trains of N channels which are to be divided from a TDM optical signal pulse train wherein optical signal pulse trains of N channels have been multiplexed in time series. An optical wavelength multiplexer 11 combines the time-division-multiplexed optical signal pulse train and the control optical pulse train. The light output from an optical wavelength multiplexer 11 is input to a nonlinear material 12, which induces a four-wave mixing effect between the control optical pulse stream having the N optical frequencies and optical signal pulse trains of N channels, and outputs a frequency-converted optical pulse train which is the combination of N optical pulse trains having different optical frequencies. An optical wavelength demultiplexer 13 spatially divides the N types of optical pulse trains according to each optical frequency from the frequency-converted optical pulse train.

10 Claims, 21 Drawing Sheets

OTHER PUBLICATIONS

T. Morioka et al., "Multiple–output, 100 Gbit/s All–optical Demultiplexer Based on Multichannel Four–wave Mixing Pumped by a Linearly–chirped Square Pulse," Electronics Letters, vol. 30, No. 23, pp. 1959–1960 (Nov. 10, 1994).

T. Yamamoto et al., "Optical Demultiplexing and Routing of a TDM Signal by Using Four–Wave Mixing and a Novel Wavelength Router with Optical Circulators and Fibre Gratings," Electronics Letters, vol. 31, No. 9, pp. 744–745 (Apr. 27, 1995).

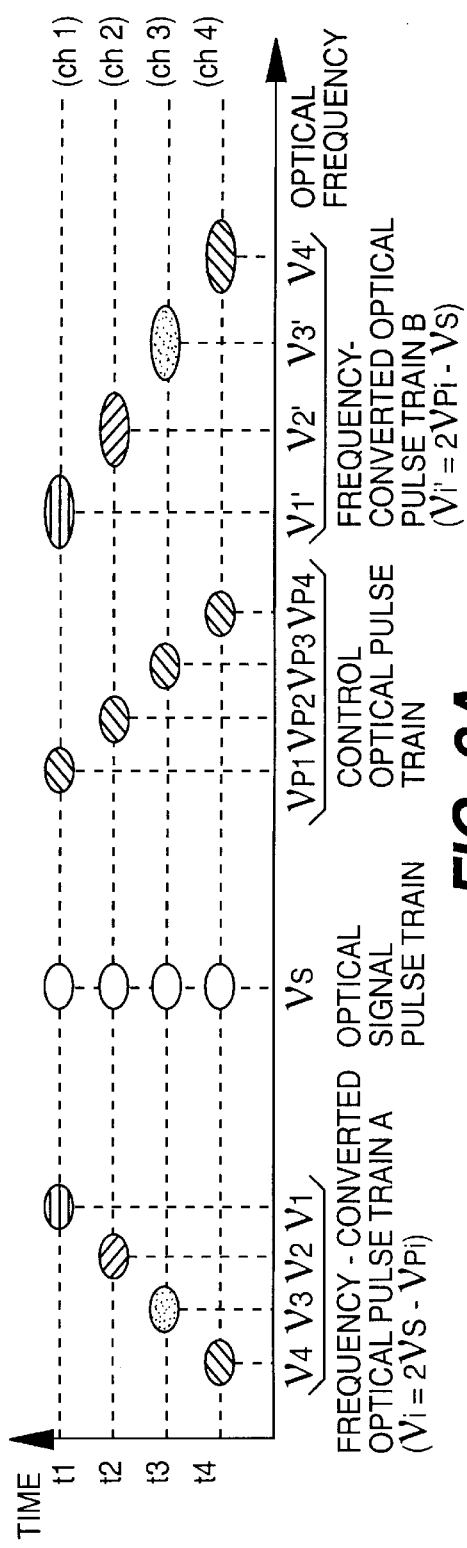
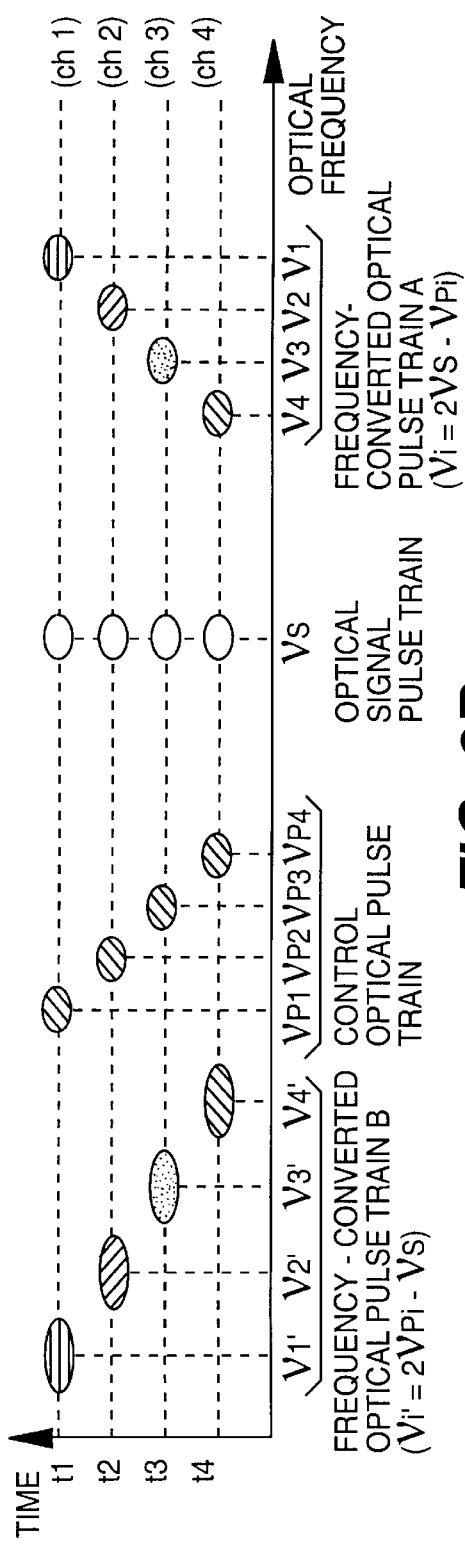
FIG. 2A
FIG. 2B

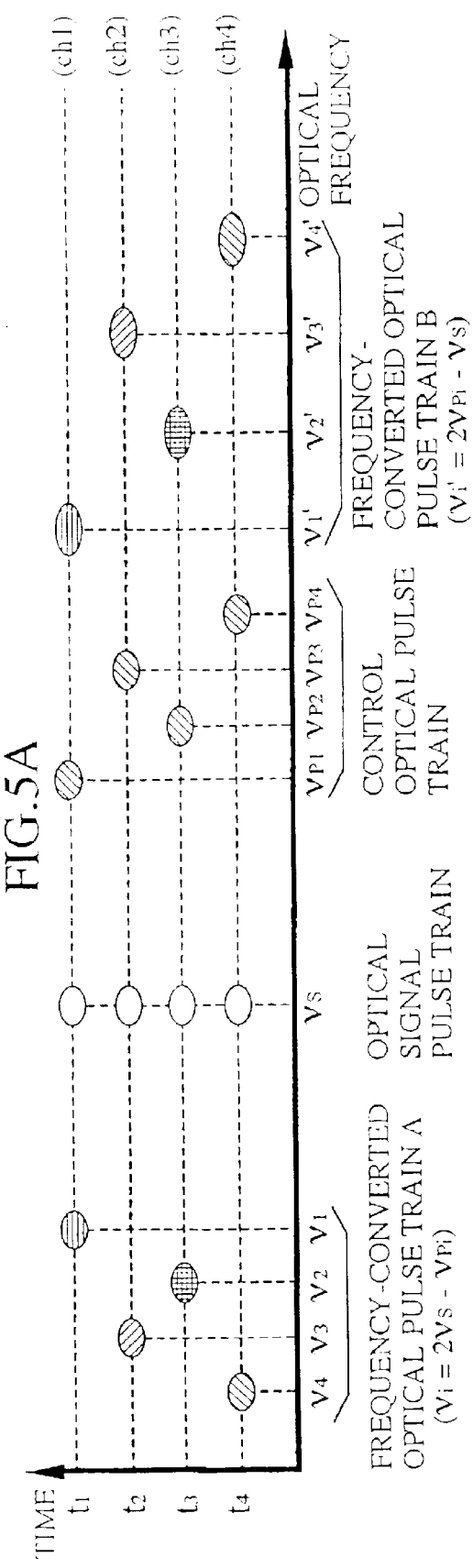
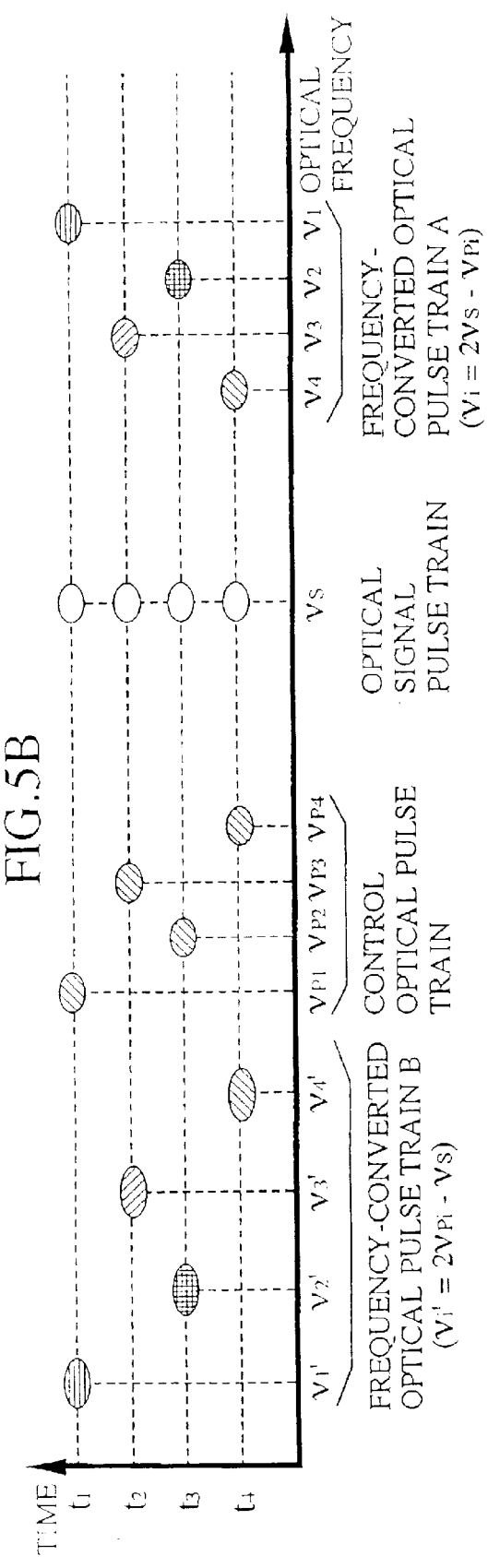

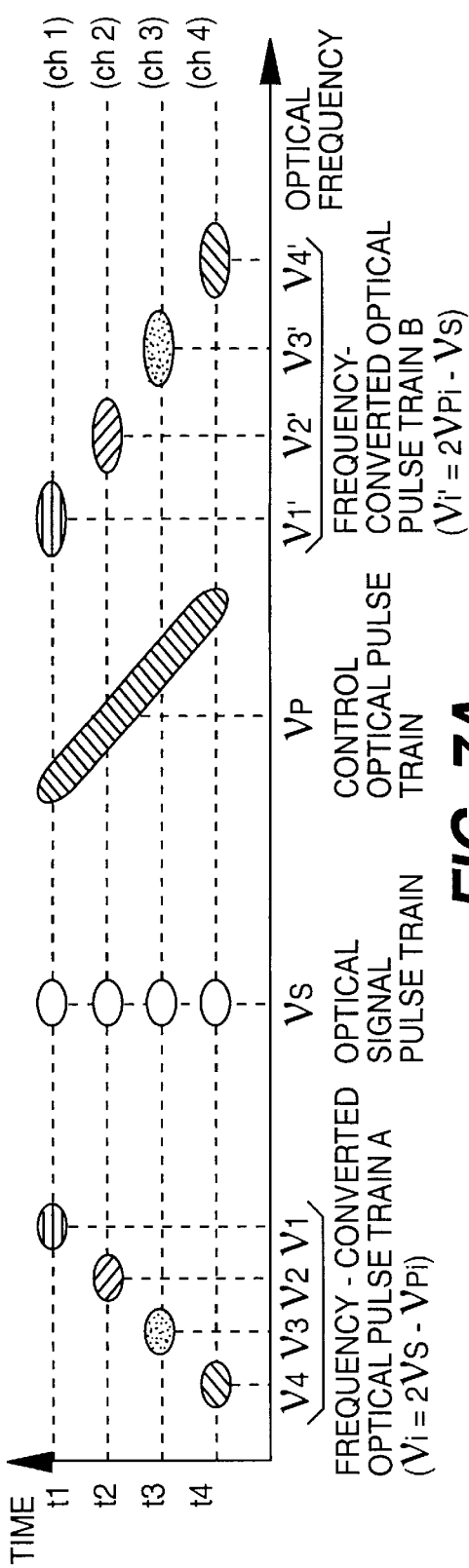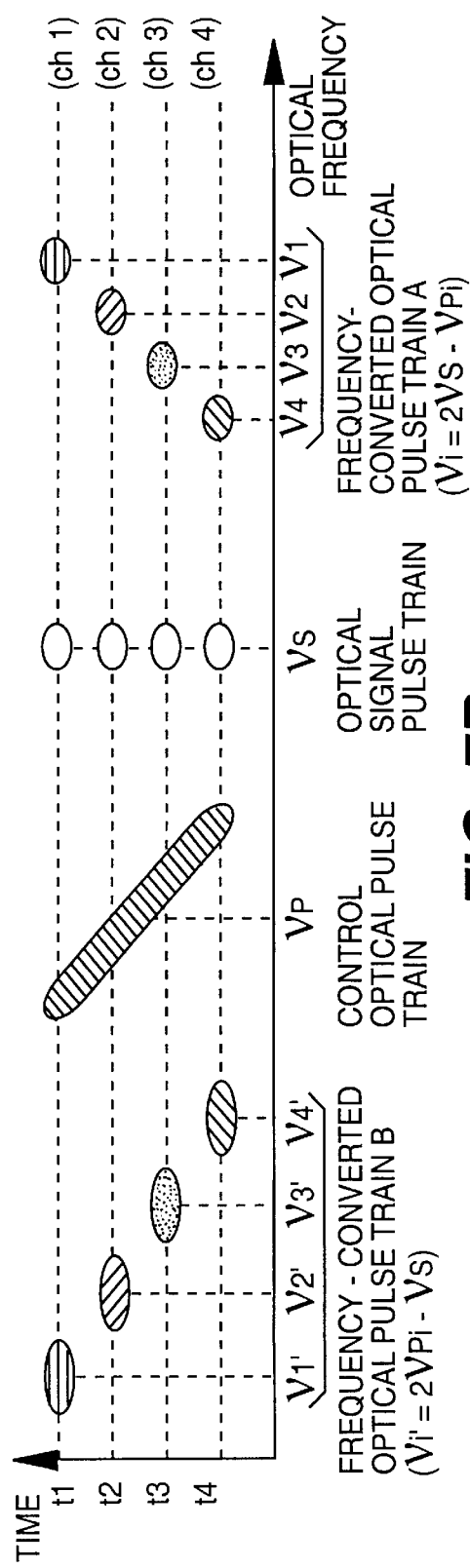

SHORT OPTICAL PULSE

SPECTRUM BY SELF PHASE MODULATION

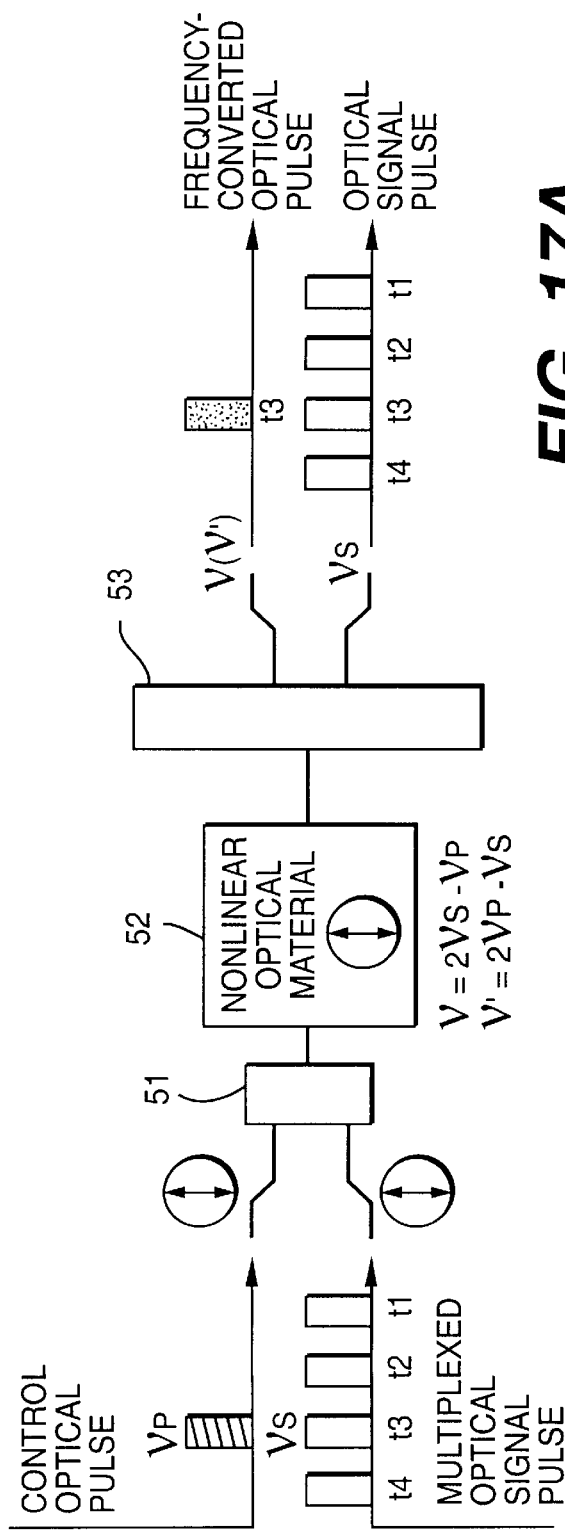
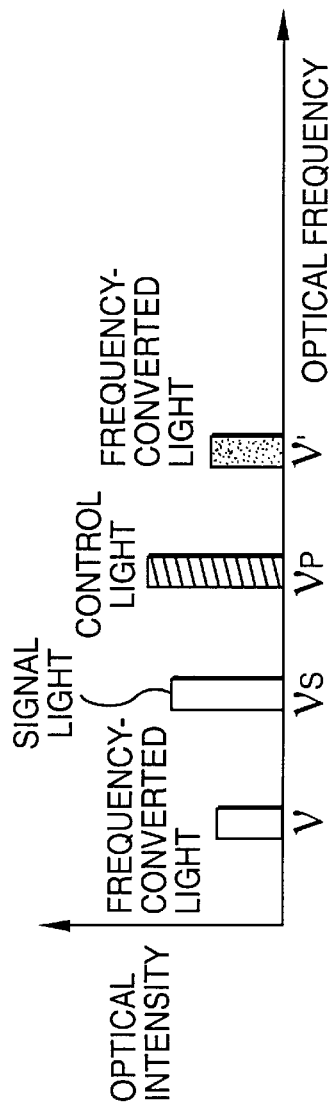
FIG. 17A (PRIOR ART)
FIG. 17B (PRIOR ART)

MULTIPLE-CHANNEL ALL-OPTICAL TDM-WDM CONVERTER AND MULTIPLE-CHANNEL ALL-OPTICAL TDM DEMULTIPLEXER

This application is a continuation of application Ser. No. 08/514,919, filed Aug. 14, 1995 now abandoned.

BACKGROUND OF THE INVENTION

1. Field of the Invention

The present invention relates to a multiple-channel all-optical TDM Time-Division-Multiplexed-WDM (Wavelength Division Multiplexed) converter and a multiple-channel all-optical TDM demultiplexer which separate the time-division-multiplexed optical signal pulse train to every channel spatially and simultaneously, in a TDM optical transmission system.

2. Description of the Related Art

Research has been conducted extensively in time-division-multiplexed optical transmission systems to develop a TDM demultiplexer, which separates a time-division-multiplexed optical signal pulse train to every channel at high speed without converting the optical signal into an electric signal, as well as a TDM multiplexer.

FIG. 14 shows the configuration of a future time-division-multiplexed optical transmission system in which all the processing is performed all-optically such as the TDM demultiplexer. In the time-division-multiplexed optical transmission system shown in FIG. 14, each light that is output from N optical sources L-1 to L-N (N is an integer greater than 1), is modulated with the signal pulse trains of frequency $f_0$ (an electric signal) in modulators M-1 to M-N arranged corresponding to optical sources L-1 to L-N.

Optical signal pulse trains output from modulators M-1 to M-N are multiplexed in time series in the optical multiplexer (MUX) and become a time-division-multiplexed optical signal pulse train at a bit rate of $Nf_0$ bit/s over hundred Gbit/s. The time-division-multiplexed optical signal pulse train is transmitted in the transmission line consisting of optical fiber and optical repeaters devices (optical amplifiers) linearly or nonlinearly (soliton transmission), and is separated into the original N optical signal pulse trains at $f_0$ bit/s spatially by the optical demultiplexer (DEMUX). Optical signal pulse trains separated by the optical DEMUX are detected by the N optical detection devices D-1 to D-N.

In addition to the above, the optical sampling circuit for monitoring the waveform of the time-division-multiplexed optical signal pulse train is positioned in front of the optical DEMUX. The bit rate of each optical signal pulse train separated spatially by the optical DEMUX becomes a bit rate of $f_0$. In the TDM demultiplexer, the demultiplexing operation is performed all-optically in order to achieve a transmission bit rate of more than 100 G bits/s.

In future optical communication networks, TDM-WDM converters to convert TDM optical signal pulse trains into WDM optical signal pulse trains are needed.

FIG. 15 shows the role of the TDM-WDM converter in the above situation. The TDM-WDM converter shown in FIG. 15 is arranged in the node that converts a TDM optical signal pulse train into a WDM optical signal pulse train.

When the TDM optical signal pulse train of wavelength $\lambda_0$ is input, the TDM-WDM converter converts the TDM optical signal pulse trains into optical signal pulse trains having different wavelengths $\lambda_1$ to $\lambda_4$, and outputs these WDM time-division-multiplexed optical signal pulse trains.

Because the TDM demultiplexer and the TDM-WDM converter mentioned above are constituted on the basis of the same principal as the present invention, only the TDM demultiplexer (optical pulse demultiplexer) will be explained here.

FIG. 16 shows an example of a conventional optical pulse demultiplexer. The device shown in FIG. 16 is called a "nonlinear loop mirror". An optical Kerr medium (nonlinear optical material) 42 is inserted in a loop between two ports 41b and 41c in a two by two optical coupling device (optical coupler) 41. Furthermore, an optical wavelength multiplexer 43 is inserted between a port 41b and the optical Kerr medium 42, and an optical wavelength demultiplexer 44 is inserted between a port 41c and the optical Kerr medium 42. A time-division-multiplexed optical signal pulse train which is input via optical circulator 45 is input into port 41a of the optical coupling device 41.

The time-division-multiplexed optical signal pulse train is divided into two by the optical coupling device 41. One of these divided signals is input into the loop from port 41b to propagate clockwise, and the other signal is input into the loop from port 41c to propagate counterclockwise. In addition, a control optical pulse train is input into the loop via the optical wavelength multiplexer 43, propagates clockwise, and is output from the optical wavelength demultiplexer 44 to outside of the loop.

The phase of the time-division-multiplexed optical signal pulse which propagates clockwise, and which is overlapped with the control optical pulse, is changed by the control optical pulse based on the optical Kerr effect. Therefore, the phase of the clockwise time-division-multiplexed optical signal pulse which has been overlapped with the control optical pulse shifts by $\pi$ rad from the phase of the counterclockwise time-division-multiplexed optical signal pulse when clockwise and counterclockwise time-division-multiplexed optical signal pulses are combined in the optical coupling device 41 again. As a result, the optical signal pulse train 1 which has been overlapped with the control optical pulse is separated and is output from port 41d.

On the other hand, the phase of the clockwise time-division-multiplexed optical signal pulse which has not been overlapped with the control optical pulse almost coincides with the phase of the counterclockwise time-division-multiplexed optical signal pulse. Therefore, the optical signal pulse train 2 is output from the port 41a. This optical signal pulse train 2 is output via optical circulator 45 to the outside. In this way, it is possible to separate only the specified channel that the control optical pulse train is synchronous with in the time-division-multiplexed optical signal pulse train.

A conventional optical pulse demultiplexer having a constitution different from the constitution shown in FIG. 16 will be explained referring to FIGS. 17A and 17B. FIG. 17A shows a conventional optical pulse demultiplexer that utilizes the four-wave mixing effect. The structure shown in FIG. 17A utilizes an optical frequency conversion function by the four-wave mixing effect in an optical fiber (P. A. Andrekson et al., "16 Gb/s all-optical demultiplexing using four-wave-mixing", Elect. Lett. vol. 27, pp. 922–924, 1991). In this device, the time-division-multiplexed optical signal pulse (optical frequency $v_s$) and the control optical pulse (optical frequency $v_p$) are combined by the optical wavelength multiplexer 51, and is input into a third-order nonlinear optical material (polarization-maintaining optical fiber) 52.

In the nonlinear optical material 52, the time-division-multiplexed optical signal pulse and the control optical pulse interact parametrically by the four-wave mixing effect which is one of third-order nonlinear optical effects. Because of the above interactions, in the nonlinear optical material 52, a frequency-converted optical pulse having an optical frequency ν (where ν=2ν$_s$−ν$_p$) or a frequency-converted optical pulse having the optical frequency ν' (where ν'=2ν$_p$−ν$_s$) is generated. In other words, a frequency-converted optical pulse having an optical frequency ν or ν' is generated as shown in FIG. 17B for the time-division-multiplexed optical signal pulse overlapping with the control optical pulse. The frequency-converted optical pulse train consisting of such a frequency-converted optical pulse can be separated from the output of the nonlinear optical material 52 using an optical wavelength demultiplexer 53 or an optical filter. In other words, it is possible to separate only the optical signal pulse train of a specified channel that is synchronous with the control optical pulse train from the time-division-multiplexed optical signal pulse train.

An optical pulse demultiplexer different from the optical pulse demultiplexer described above will be explained referring to FIGS. 18A and 18B. FIG. 18A shows the structure of an optical pulse demultiplexer of a polarization-independent type which uses a polarization rotation mirror. The optical pulse demultiplexer shown in this Figure differs greatly from the one shown in FIG. 17A. It utilize the polarization diversity technique in two counter-propagating directions of the loop, and it lets the wavelength of the control optical pulse train coincide with zero dispersion wavelength of the nonlinear optical material (optical fiber) in order to maximize the conversion efficiency, as shown in FIG. 18B. In other words, the structure shown in FIG. 18A is a polarization-independent type in which it is possible for the deimultiplexing operation to be independent of the polarization direction of the input TDM optical signal.

First, the constitution of the polarization rotation mirror MR will be explained. FIG. 19 shows an example of the polarization rotation mirror MR. As shown in FIG. 19, the polarization rotation mirror MR comprises: a polarization beam splitter 56 which reflects the polarization component of the light input from the outside which is in the vertical direction (I$_1$) with regard to the plane of the paper, and transmits the polarization component in a parallel direction (I$_0$); a loopwize polarization-maintaining optical fiber 57, the ends of which are connected to the above two output ends of the polarization beam splitter 56 along those of the polarization-maintaing fiber with the principal axes of the polarization.

This polarization-maintaing optical fiber 57 which also works as a nonlinear optical material, is connected with thee two output ends of the above-mentioned polarization beam splitter 56 with one end twisted by 90 degrees around the propagation direction, in order to rotate the polarization direction of light propagating this fiber 57 by 90 degrees. In addition, instead of twisting the polarization-maintaining optical fiber 57 itself, it is possible to rotate the polarization direction of the light in the loop by 90 degrees by using polarization rotating devices such as a Faraday rotator or a half-wave plate. In this way, all the light input to the polarization rotation mirror comes out of the same device with its polarization direction rotated by 90 degrees, instead of the polarization-maintaining optical fibers, it is possible to use other nonlinear optical materials.

In the structure shown in FIG. 18A, the time-division-multiplexed optical signal pulse (optical frequency ν$_s$) which is input to the optical wavelength multi-demultiplexer 55 via the optical circulator 54 is combined with the control optical, pulse (optical frequency ν$_p$, zero dispersion wavelength of the polarization-maintaing optical. fiber 57), and is input to the polarization rotation mirror MR.

At this time, the polarization direction of the optical signal pulse train is random, and the polarization direction of the control optical pulse train is set at 45 degree angles between two principal axes of the polarization-maintaining optical fiber 57. The optical pulse train input to the polarization beam splitter 56 so the polarization rotation mirror MR is divided into a polarization component which is vertical with regard to the plane of the paper and a polarization component which is parallel with regard to the plane of the paper, and both polarization components clockwise and counterclockwise propagate through the loop consisting of the polarization-maintaing optical fiber 57. The control optical pulse is divided into the two direction, in equal intensity because if the 45 degree polarization, and the optical signal pulse is divided with an arbitrary ratio into the two directions depending on the input polarization state. In the example of FIG. 18, the polarization direction of the component which is propagated counterclockwise is rotated by 90 degrees, and coincides with the polarization direction of the component which is propagated clockwise. Therefore, only one principal axis of the polarization-maintaing optical fiber is used. Because the four-wave mixing conversion efficiency is determined by the control optical pulse intensity, the equal efficiency is achieved in both directions.

The polarization-independent operation is therefore achieved regardless of the fact that the original signal intensity differs in both directions.

The pulse train which is output from the polarization rotation mirror MR is input to the wavelength separation element 58 via the optical wavelength multi-demultiplexer 55 and the optical circulator 54, and is separated into every wavelength. Then, it makes the optical signal pulse train of wavelength ν$_s$ and the frequency-converted optical pulse train of wavelength vs' spatially separate.

Incidentally, the conventional optical pulse demultiplexer shown in FIG. 16 can only separate a specified channel from other channels with which the control optical pulse is synchronous. Therefore, there is a problem that the circuit of the TDM demultiplexer is complex and large-scale, as a result N-1 optical pulse demultiplexers need to be used to completely separate N TDM channels.

Furthermore, the conventional optical pulse demultiplexer shown in FIGS. 17A and 18A can extract from the TDM optical signal pulse train the frequency-converted optical pulse (ν, ν') of the specified channel to which the control optical pulse is synchronous. Therefore, in order to completely separate N channels, it is necessary to separate one channel per circuit using N optical pulse demultiplexers. Therefore, there is a problem that the circuit is complex and has a large size.

SUMMARY OF THE INVENTION

The objective of the present invention is to provide a multiple-channel all-optical TDM-WDM converter and multiple-channel all-optical TDM demultiplexer which can spatially and simultaneously separate optical signal pulses from a time-division-multiplexed optical signal pulse train without using a multistage-structure.

In order to achieve the above objective, the present invention comprises: a control optical source for generating an control optical pulse train containing N different optical frequencies, wherein N is an integer grater than or equal to 2, at a timing which is synchronous with optical signal pulse trains of N channels which are to be separated from a time-division-multiplexed optical signal pulse train have been; an optical wavelength multiplexing means which combines said time-division-multiplexed optical signal pulse train and said control optical pulse train; a nonlinear optical material for inputting light output from said optical wavelength multiplexing means, inducing the four-wave mixing effect between said optical signal pulse trains of N channels and said control optical pulse train containing N optical frequencies, and outputting a frequency-converted optical pulse train wherein N types of optical pulse trains having different optical frequencies are mixed; an optical wavelength demultiplexing means for spatially separating said N types of optical pulse train from said frequency-converted optical pulse train according to each of said N optical frequencies. As a result, it is possible to simultaneously separate N channels using only one TDM demultiplexer whose size is almost equal to that of the conventional TDM demultiplexer that can separate only one channel at a time.

In another aspect of the present invention, said control optical source generates an control optical pulse train in which an optical frequency monotonically-changes in time series. According to the structure described above, it is possible to simultaneously separate N channels by separating the frequency-converted optical pulse train having N optical frequencies.

According to another aspect of the present invention, said control optical source generates an control optical pulse train with chirping, wherein an optical frequency changes continually in time series, and a time width containing optical signal pulse trains of N channels. As a result, it is possible to generate the control optical pulse train easily.

According to another aspect of the present invention, said time-division-multiplexed optical signal pulse train consists of only polarization components in the direction of one of two principal axes of said nonlinear optical material, and said control optical pulse train consists of only polarization components in a direction identical to that of the polarization components of said time-division-multiplexed optical signal pulse train. As a result, precise separation is possible even if a nonlinear optical material is used wherein the efficiencies of four-wave mixing effects in its two principal axes are different.

Another aspect of the present invention further comprises a birefringence compensation means which compensates for a propagation group delay difference produced between two principal axes of said nonlinear optical material, placed between said optical wavelength multiplexing means and said optical wavelength demultiplexing means. As a result, it is possible to construct a polarization-independent circuit.

According to another aspect of the present invention, said control optical source generates an control optical pulse train polarized in a direction in which the conversion efficiencies for four-wave mixing in the two principal axes of said nonlinear optical material are equal, and further comprising: a polarization rotation mirror for rotating both. polarization components of light output from said nonlinear optical material through by 90 degrees and reintroducing the polarization-rotated light into said nonlinear optical material; an optical dividing means for sending light output from said optical wavelength multiplexing means to said nonlinear optical material, and for sending a part or all of light output from said nonlinear optical material to said optical wavelength demultiplexing means. According to the structure described above, the polarizations of the optical signal pulse train and the control optical pulse train rotate by 90 degrees, and pass through the nonlinear optical material twice. As a result, a difference in the delay time between the two polarization components in the nonlinear optical material is completely compensated for, so that polarization independent operation, which does not depend on the polarization of time-division-multiplexed optical signal pulse train, is achieved.

Another aspect of the present invention further comprises: a polarization beam splitter for separating light output from said optical wavelength multiplexing means into two polarization components polarized in the directions of the principal axes of said nonlinear optical material; an optical connection means forming a loop which connects said polarization beam splitter and said nonlinear optical material with their principal axes aligned, wherein one of said two polarization components is input to one end of said nonlinear optical material and the other of said two polarization components is input after undergoing a rotation of 90 degrees to another end of said nonlinear optical material; an optical coupling means for sending light output from said optical wavelength multiplexing means into said polarization beam splitter and for sending a part or all of light output from said polarization beam splitter to said optical wavelength demultiplexing means. As a result, in the nonlinear optical material, the four-wave mixing effect is equally induced in both clockwise and counterclockwise directions which correspond to each polarization component of the optical signal pulse train, achieving polarization independent operation.

In another aspect of the present invention, the control optical source further comprises: a wide band pulse generation means for outputting a wide band optical pulse which contains optical frequency of a short optical pulse when said short optical pulse is input; an optical wavelength demultiplexer for demultiplexing said wide band optical pulse output from said wide band pulse generation means into N wavelength components; N optical selection delay means for selecting different optical frequency components output from said optical wavelength demultiplexer and delaying each of said optical frequency components by a different time; an optical coupling device for combining then outputs of said N optical selection delay means. As a result, it is possible to generate an optical control pulse train having an arbitrary pattern containing N optical frequencies.

In another aspect of the present invention, the control optical source further comprises: a wide band pulse generation means for outputting a wide band optical pulses which contains optical frequency of a short optical pulse when said short optical pulse is input; a chirping means for chirping the wide band optical pulses output from said wide band pulse generation means; an optical bandpass filter for filtering the pulses output from said chirping means. As a result, it is possible to easily generate a control optical pulse train which is linearly chirped and has a desired time width.

In another aspect of the present invention, the control optical source further comprises a nonlinear dispersive material having ordinary dispersion for outputting wide band chirped optical pulses with optical frequencies of input short optical pulses. As a result, it is possible to easily generate a control optical pulse train which is linearly chirped and a desired time width.

BRIEF DESCRIPTION OF THE DRAWINGS

FIGS. 2A and 2B shows examples of optical frequency conversion by the four-wave mixing effect of the first embodiment of the present invention.

FIG. 5A shows another optical frequency conversion example of the first embodiment of the present invention.

FIG. 5B shows another optical frequency conversion example of the first embodiment of the present invention.

FIG. 7A shows an optical frequency conversion example by the four-wave mixing effect of the second embodiment of the present invention.

FIG. 7B shows the optical frequency conversion example by the four-wave mixing effect in the second embodiment of the present invention.

FIG. 17A shows an example of the structure of a conventional TDM demultiplexer using the four-wave mixing effect.

FIG. 17B shows an example of the four-wave mixing effect utilized in an example shown in FIG. 17A.

DESCRIPTION OF THE PREFERRED EMBODIMENTS

Each embodiment of the present invention will be described referring to the figures. Parts which are common in the figures have been referred to using the same reference numbers.

The First Embodiment

Figure 1:
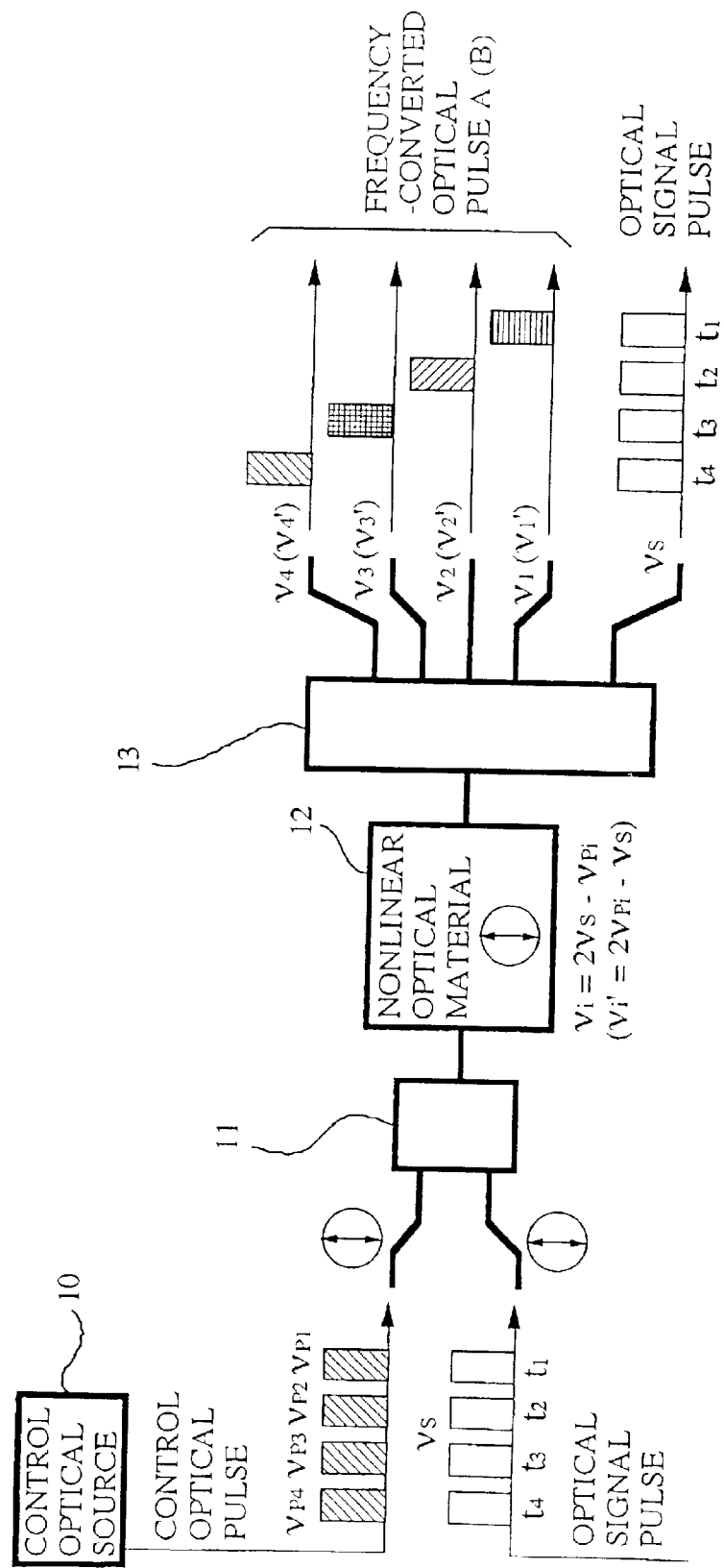
FIG. 1 shows the structure of the first embodiment of the present invention.

FIG. 1 shows an example of the structure of a multiple-channel all-optical TDM demultiplexer based on the first embodiment of the present invention. In the present embodiment, the demultiplexer which separates four channels simultaneously will be described.

In FIG. 1, the time-division-multiplexed optical signal pulse train (optical frequency $v_s$), which is time-division-multiplexed and the control optical pulse train, which has four kinds of optical frequencies (optical frequency=$v_{pi}$, wherein i=1, 2, 3, and 4), are combined in the optical wavelength multiplexer 11 in such a way that corresponding optical pulses overlap in time, and are input into a nonlinear optical material 12. Furthermore, the optical frequencies of the control optical pulse train, increase or decrease in time, are synchronous to the time-division-multiplexed optical signal pulse train.

In the nonlinear optical material 12, the four-wave mixing effect is induced between the time-division-multiplexed optical signal pulse and the control optical pulse. Output from the nonlinear optical material 12 is separated on the basis of every optical frequency by a single-input and multi-output type optical wavelength demultiplexer 13. It is possible to use a polarization maintaining optical fiber, a semiconducting nonlinear material such as a semiconductor laser amplifier, an organic. nonlinear material or the like as the nonlinear optical material 12. An optical frequency conversion example based on the four-wave :nixing effect will be described in the present embodiment referring to FIGS. 2A and 2B.

FIG. 2A shows a situation wherein the optical frequency $v_{pi}$ of the control optical pulse train is higher than the optical frequency $v_s$ of the time-division-multiplexed optical signal pulse train, and FIG. 2B shows the opposite situation. The control optical pulse train (optical frequency $v_{pi}$, wherein i=1, 2, 3, and 4) is synchronous with a time-division-multiplexed optical signal pulse train (optical frequency $v_s$) for each time slot $t_1$, t2, t3, and t4. Therefore, the optical signal pulse of each channel induces the four-wave mixing effect with the control optical pulse wherein optical frequencies are different from each other, and generates the frequency-converted optical pulse train A of optical frequency vi (wherein vi=$2vs-v_{pi}$) or the frequency-converted optical pulse train B of optical frequency vi' (wherein vi'=$2v_{pi}-v_s$). Frequency-converted optical pulse train A is an example where a time-division-multiplexed optical signal pulse of optical frequency $v_s$ degenerates in the four-wave mixing process. Frequency-converted optical pulse train B is an example where a time-division-multiplexed optical signal pulse of optical frequency $v_{pi}$ degenerates in the four-wave mixing precess.

In addition, when a polarization-maintaining optical fiber is used as the nonlinear optical material 12, it is possible to maximize the generation efficiency of the frequency-converted optical pulse train A or the frequency-converted optical pulse train B by matching the center wavelength of the time-division-multiplexed optical signal pulse train or the control optical pulse train which will be the degenerate light and the zero dispersion wavelength of the nonlinear optical material 12.

On the other hand, when a semiconductor laser amplifier whose input and output surfaces are AR-coated (anti-reflection coated) is used as the nonlinear optical material 12, the adjustment mentioned above is unnecessary because the phase matching condition is met whether the central wavelength is close to the zero dispersion wavelength or not. By making frequency-converted optical pulse train A or frequency-converted optical pulse train B demultiplexed into each optical frequency, it is possible to separate the four channels simultaneously. In addition, in the structure which uses the four-wave mixing effect, it is possible to separate the original time-division-multiplexed optical signal pulse train by the optical wavelength demultiplexer 13 because the time-division-multiplexed optical signal pulse train of optical frequency $v_s$ is also output.

Therefore, by connecting above-mentioned circuits in series and using the time-division-multiplexed optical signal pulse train which is output from the front stage in each circuit, it is possible to separate an optical signal pulse of the desired channels which were not separated in the front stage. Furthermore, it is possible to read arbitrary channels repeatedly. Furthermore, it is possible to separate the control optical pulse train of optical frequency $vp_1$, $vp2$, $vp3$, and $vp4$ demultiplexed.

Figure 3A:
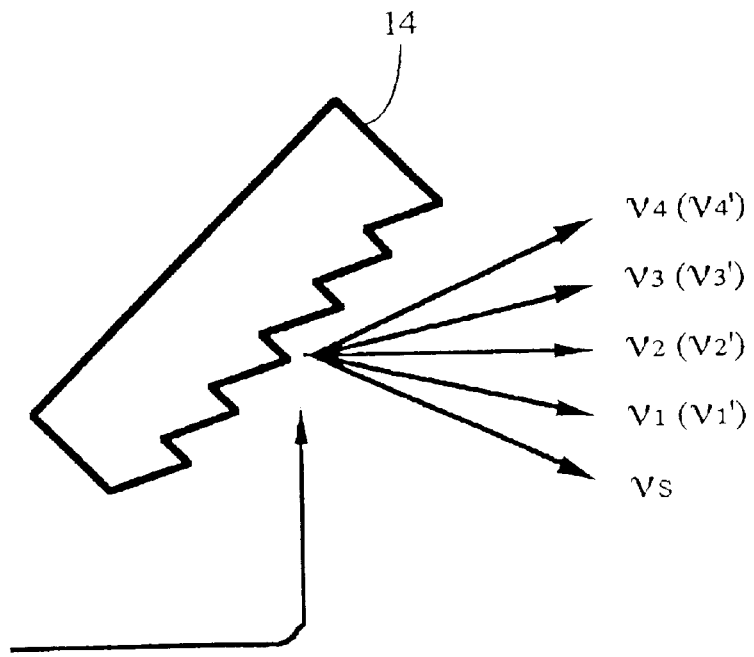
FIG. 3A shows a specific example of the structure of the optical wavelength demultiplexer 13.
Figure 3B:
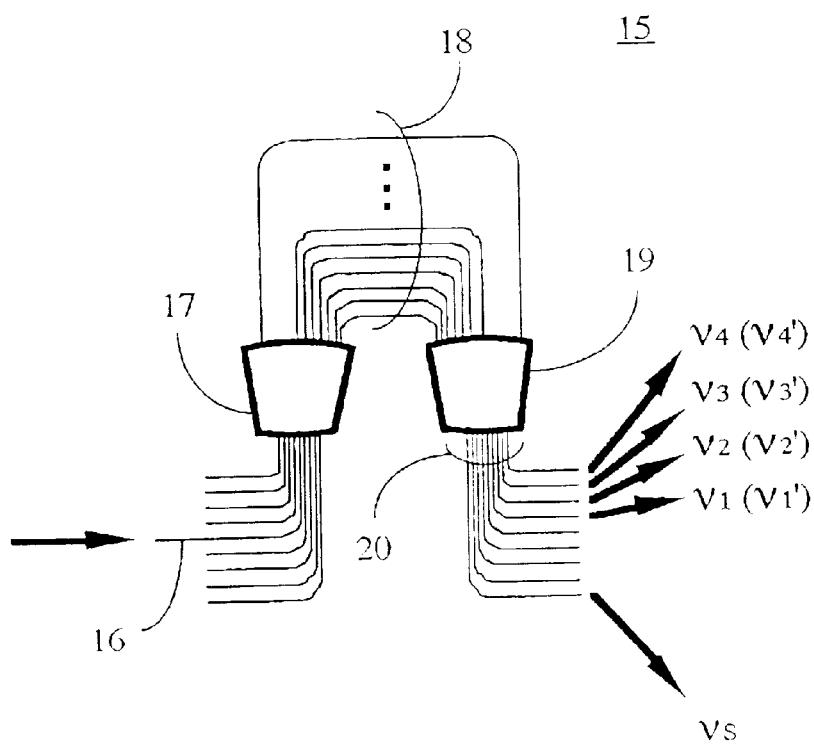
FIG. 3B shows a specific example of the structure of the optical wavelength demultiplexer 13.

As the optical wavelength demultiplexer 13, it is possible to use the reflection type diffraction grating 14 or the arrayed optical waveguide type wavelength demultiplexer 15 as shown in FIG. 3A and 3B. The arrayed optical waveguide type wavelength demultiplexer 15 consists of the input waveguide array 16, the input concave slab optical waveguide 17, the arrayed optical waveguide (waveguides have optical path length differences of $\Delta L$ between each other) 18, the output concave slab optical waveguide 19, the outputting waveguide array 20.

Light distributed between arrayed optical waveguide 18 via the input concave slab optical waveguide 17 from the input waveguide 16 is different in phase after passing through the arrayed optical waveguide 18 depending on each optical frequency, and has a different convergence position in output concave slab optical waveguide 19 according to the optical frequency. Therefore, light whose optical frequencies are different, are taken out from different output waveguides 20, and acts as optical wavelength demultiplexer (H. Takahashi, Y. Hibino, I. Nishi, "Polarization-insensitive arrayed-waveguide grating wavelength multiplexer on silicon", Optics Lett., vol. 17, pp. 449–501, 1992).

The generation method of the control optical pulse which has multi-wavelength components, in other words, the structure of the control optical source 10 will be described. In the generation method shown in FIG. 4A and 4B, the wide band white pulse generating optical fiber 21, the 1 to N optical dividing means 22, N wavelength selection means 23-1 to 23-N, N-1 optical delay means 24-1 to 24-(N-1), 1), and the optical coupling means 25 are used.

Figure 4A:
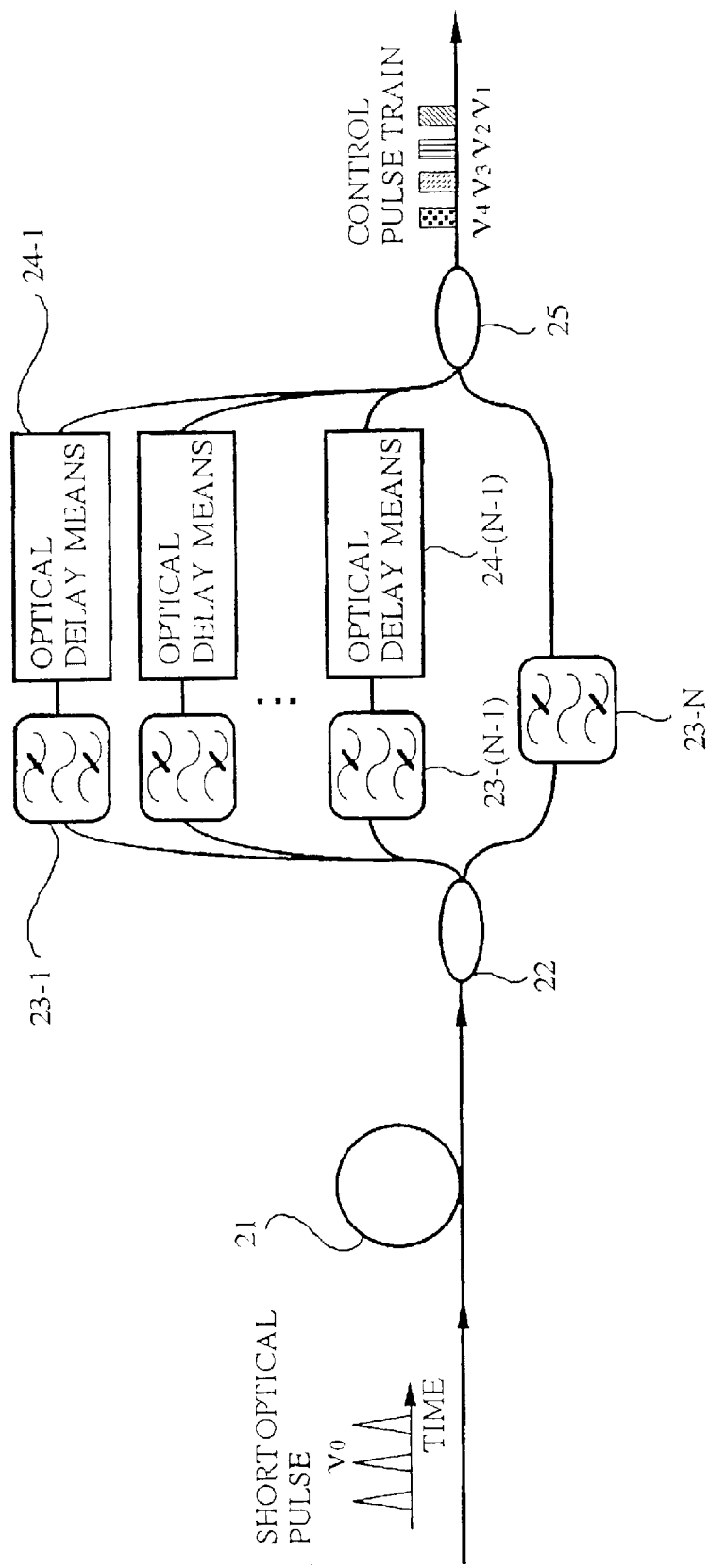
FIG. 4A shows a specific example of the structure of the control optical source 10.
Figure 4B:
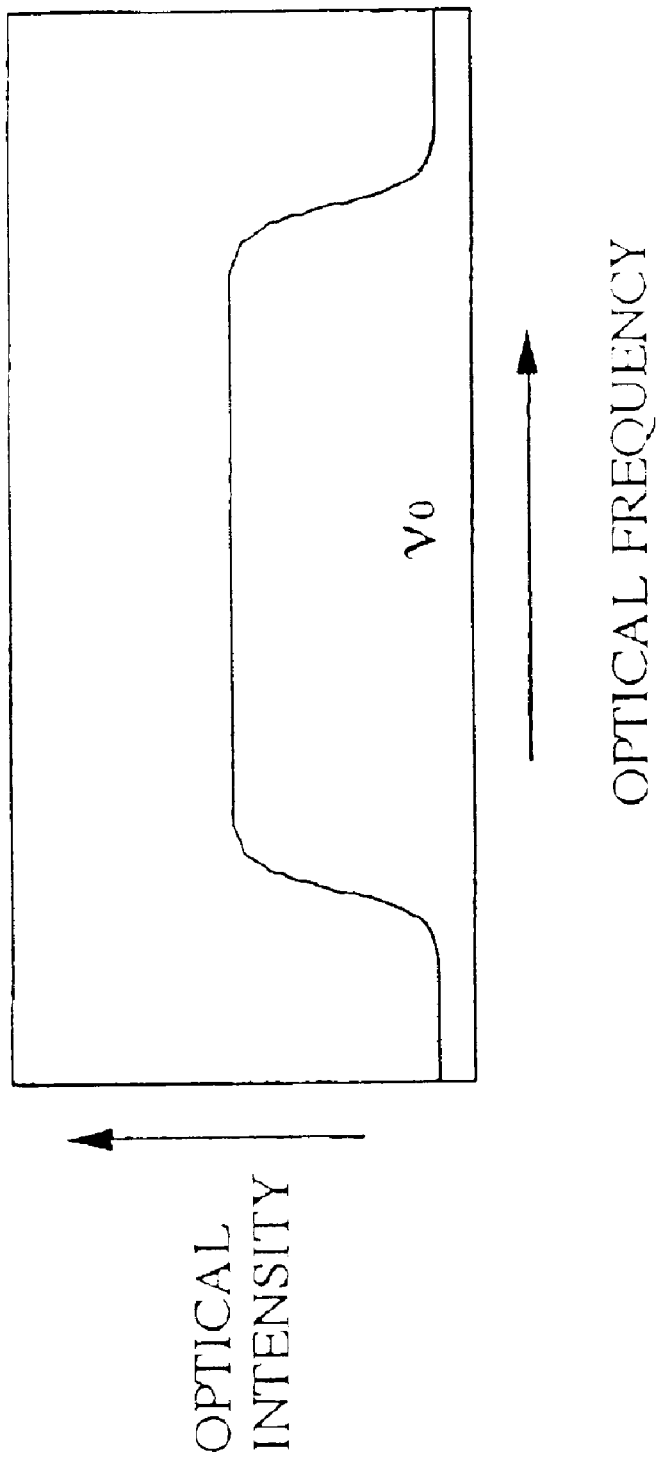
FIG. 4B shows a characteristic of a pulse generated by the white pulse generation optical fiber 21.

When a short optical pulse (optical frequency $v_0$) is input into white pulse generation optical fiber 21, a wide band white pulse (center optical frequency $v_0$) as shown in FIG. 4B is generated. For example, when a short optical pulse of around several pico seconds having peak power of two to three W is input into white pulse generation optical fiber 21 of a few kilometers in length, a white pulse whose spectrum width is more than 200 nm is generated. The white pulse generated is divided into N components in the optical dividing device 22, and input into the every wavelength selection means 23-1 to 23-N. In wavelength selection means 23-1 to 23-N, only optical pulses of specified optical frequency which are respectively different are transmitted and output, in optical delay means 24-1 to 24-(N-1), every transmission optical pulse is delayed for the time that is varied respectively.

In addition, in FIG. 4A, it is possible to arrange the N-th. delay means, and to let all transmission optical pulses be delayed. All the transmission optical pulses are put together by the optical coupling device 25, and a control optical pulse train of multi-wavelength used in the present embodiment is provided. In addition, although the example mentioned above was described using a white pulse generation optical fiber 21, anything capable of generating a white pulse can be used. Furthermore, monotone increasing and monotone decreasing is not necessarily needed for the control optical pulse train mentioned above. For example, as shown in FIG. 5A and FIG. 5B, it is sufficient that the optical frequencies of each optical pulses within a single cycle be different. In other words, by establishing the transmission frequency of each wavelength selection means 23-1 to 23-N arbitrarily, it is possible to achieve the multiple-channel all-optical TDM-WDM converter that converts time-division-multiplexed optical pulse trains into the wavelength-division-multiplexed optical pulse trains consisting of optical pulse trains of arbitrary wavelength.

In addition, FIG. 5A shows a situation in which the optical frequency $v_{pi}$ of the control optical pulse train is higher than the optical frequency $v_s$ of the time-division-multiplexed optical signal pulse train, and FIG. 5B shows the opposite situation. It is clear that the structure of the multiple-channel all-optical TDM-WDM converter is same as the multiple-channel all-optical TDM demultiplexer from what is mentioned above. Therefore, only the multiple-channel all-optical TDM demultiplexer will be described in the following.

The Second Embodiment

Figure 6:
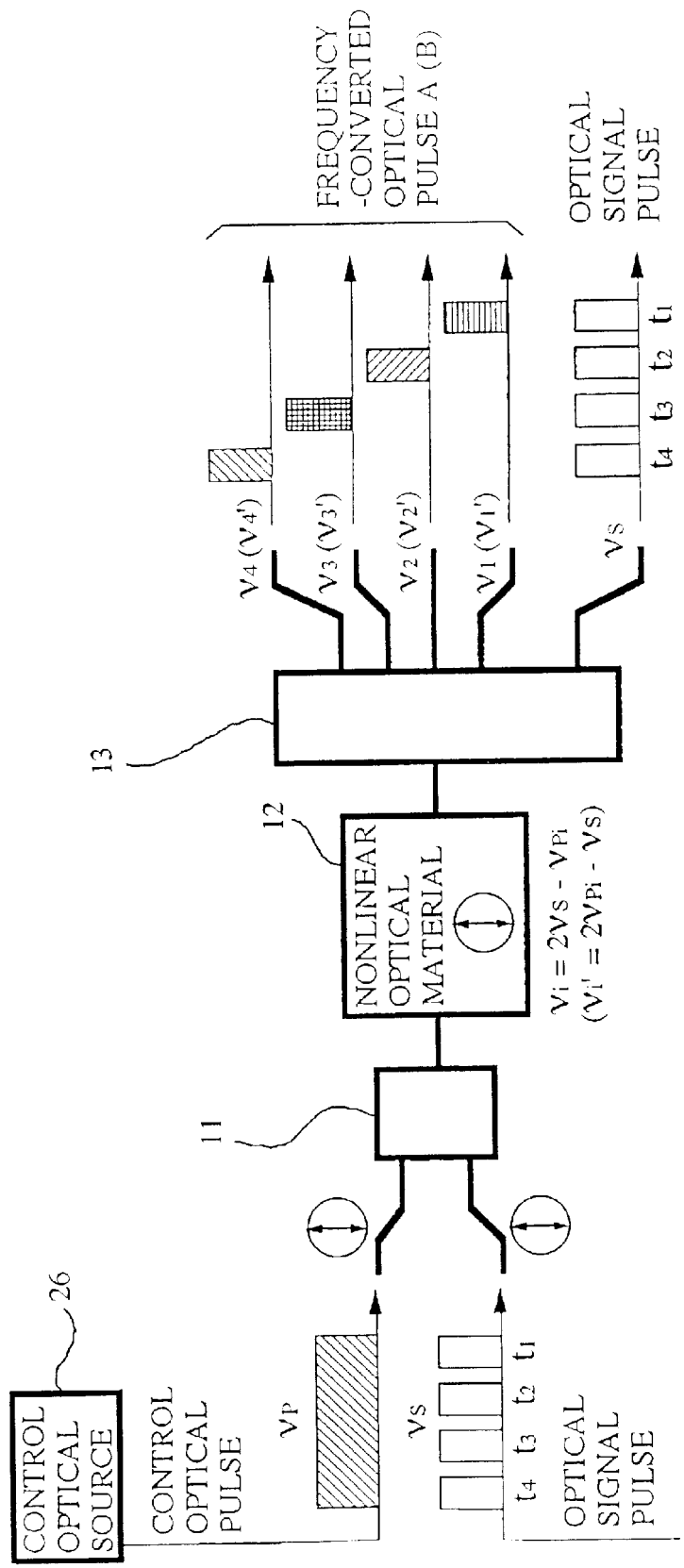
FIG. 6 shows the structure of the second embodiment of the present invention.

FIG. 6 shows the structure of the multiple-channel all-optical TDM demultiplexer based on the second embodiment of the present invention. In the present embodiment, the structure which separates four channels simultaneously will be described. The structure of the present embodiment is similar to the first embodiment with the exception of the control optical source 26. The structure includes the control optical source 26, the optical wavelength multiplexer 11, the nonlinear optical material 12, and the optical wavelength demultiplexer 13.

In the first embodiment, when separating four channels from the time-division-multiplexed optical signal pulse train simultaneously, the control optical pulse train of optical frequencies $vp_1$, $vp2$, $vp3$, and $vp4$ is generated from the control optical source 10, and used. In the present embodiment, a control optical pulse with a time width $\Delta t$ which is able to cover the optical signal pulse train of four channels ($t_1$, $t2$, $t3$, and $t4$), with an optical frequency which changes linearly in time (chirped), and a center optical frequency of $vp$ from the control optical source 26 is generated, and used. Generally, if the bit rate of the time-division-multiplexed optical signal pulse is B, and the number of channels which are to be separated simultaneously is N, then $\Delta t > N/B$ should be satisfied. This control optical pulse has the optical frequency components $v_{p1}=vp(t_1)$, $v_{p2}=vp(t_2)$, $v_{p3}=vp(t_3)$, and $v_{p4}=vp(t_4)$. Here, $vp(t_1)$ represents instantaneous optical frequency at the time point $t_1$.

The optical frequency conversion example based on the four-wave mixing effect of the present embodiment will be described, referring to FIG. 7A and 7B. FIG. 7A shows a situation in which the center optical frequency $vp$ of the control optical pulse is higher than the optical frequency $v_s$ of the time-division-multiplexed optical signal pulse train, and FIG. 7B shows the opposite situation.

The time-division-multiplexed optical signal pulse train (optical frequency $v_s$) and the optical frequency component $vp$ of the control optical pulse ($t_i$, wherein i=1, 2, 3, and 4) are synchronous to each other in each time slot t1, t2, t3, and t4. Therefore, the optical signal pulse of each channel induces the four-wave mixing effect with a control optical pulse of a different optical frequency. Therefore the frequency-converted optical pulse train A of optical frequency $v_i$ (wherein $v_i=2vs-vp_i$) or the frequency-converted optical pulse train B of optical frequency $v_i'$ (wherein $v_i'=2vp_i-vs$) is generated.

In four-wave mixing, the frequency-converted optical pulse train A or frequency-converted optical pulse train B is the pulse train when the optical signal pulse of optical frequency $v_s$ or the control optical pulse of center optical frequency vp degenerates. In addition, when using a polarization-maintainingoptical fiber as the nonlinear optical material 12, it is possible to maximize the generation efficiency of the frequency-converted optical pulse train A or the frequency-convertedcoptical pulse train B by matching the zero dispersion wavelength and the center wavelength of the time-division-multipiexedoptical signal pulse train or the control optical pulse which is degenerating light in four-wave mixing. By making the frequency-converted optical pulse train A or the frequency-converted optical pulse train B demultiplexed in each optical frequency, it is possible to separate four channels simultaneously. In addition, because it is also possible to separate the time-division-multiplexed optical signal pulse train of optical frequency $v_s$, as in the first embodiment, by connecting the present circuit to form a multistage-structure and using the optical signal pulse train which is also output, it is possible to separate the optical signal pulse of channels in each stage that have not been separated in earlier stages. Furthermore, it is possible to begin to read an arbitrary channel, repeatedly.

The generation method of the control optical pulse having linear chirping, in other words, the structure of the control optical source 26 will be described. In the first generation method, shown in FIG. 8A, 8B, 8C, and 8D, the white pulse generation optical fiber 27, the chirping adjustment optical fiber 28, and the wavelength tunable optical bandpass filter 29 are used.

Figure 8A:
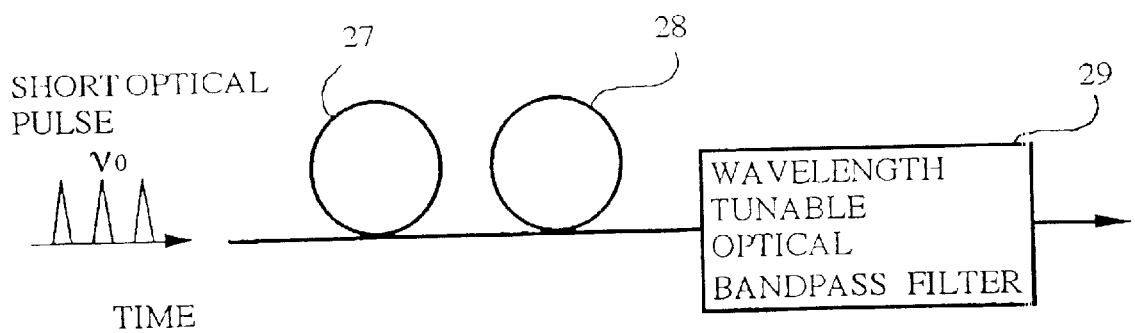
FIG. 8A shows a specific example of the structure of the control optical source 26, i.e. a first generation method of a control optical pulse having linear chirping.
Figure 8B:
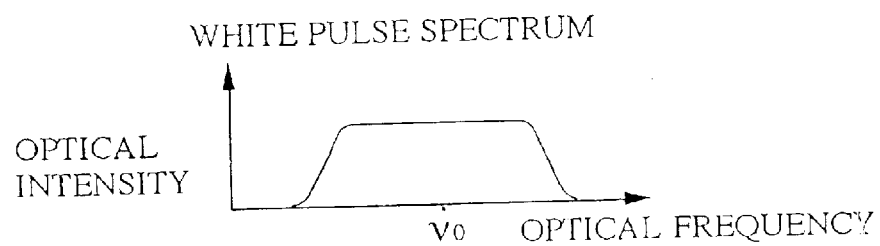
FIG. 8B shows a characteristic of a pulse generated by the white pulse generation optical fiber 27.
Figure 8C:
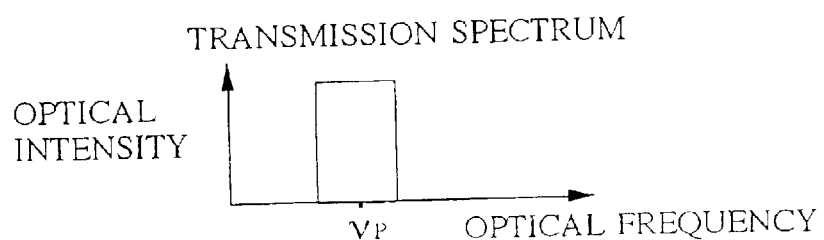
FIG. 8C shows a characteristic of the wavelength tunable optical bandpass filter 29.
Figure 8D:
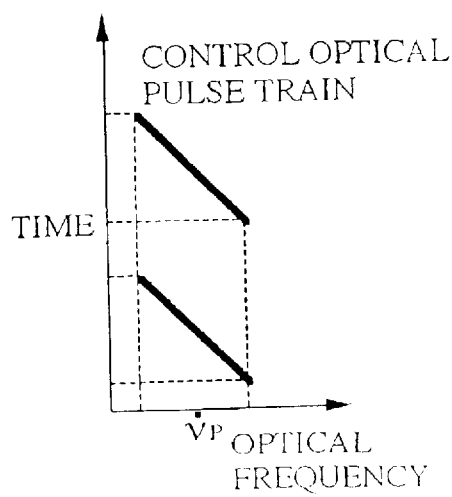
FIG. 8D shows a characteristic of an output from the wavelength tunable optical bandpass filter 29.

When the short optical pulse (optical frequency $v_0$) is input into the white pulse generation optical fiber 27, as in the case mentioned above, a wide band white pulse (center optical frequency $v_0$) as shown in FIG. 8B is generated. The wavelength tunable optical bandpass filter 29 has a rectangular spectrum transmission function as shown in FIG. 8C, filters the white pulse input via the chirping adjustment optical fiber 28, and outputs the control optical pulse which has a long time-width and linear chirping as shown in FIG. 8D. Furthermore, it is possible to generate a control optical pulse having linear chirping in arbitrary optical frequencies, by letting the center transmission wavelength change in the wavelength range of the white pulse. The chirping adjusting optical fiber 28 adjusts the absolute value and the sign of the chirping by its own dispersion characteristic.

Figure 9A:
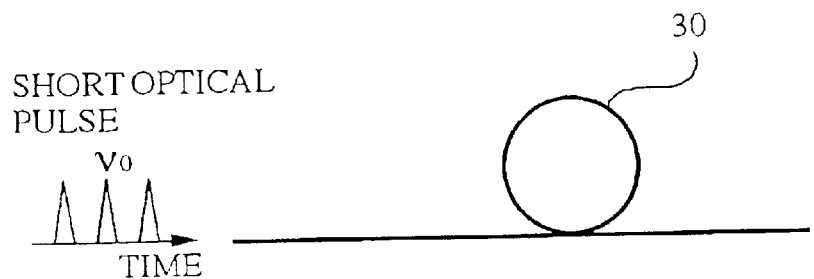
FIG. 9A shows a specific example of the structure of the control optical source 26, i.e. a second generation method of a control optical pulse having linear chirping.
Figure 9B:
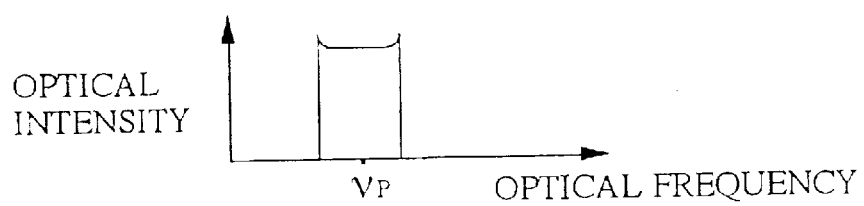
FIG. 9B shows a spectrum characteristic of an output pulse from the ordinary dispersion optical fiber 30.
Figure 9C:
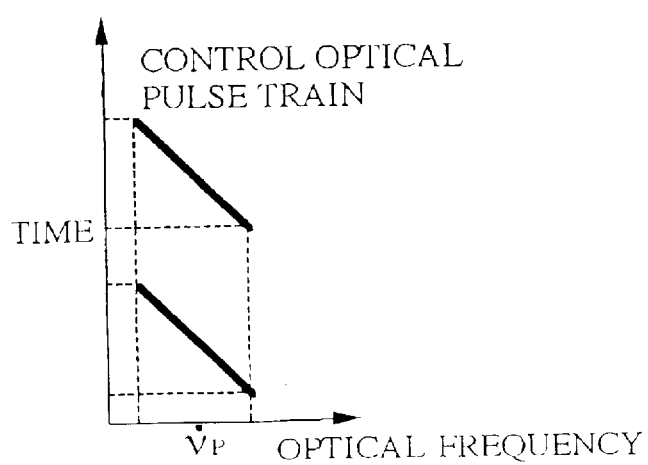
FIG. 9C shows a characteristic of an output from the ordinary dispersion optical fiber 30.

In the second generation method shown in FIG. 9A, 9B, and 9C, an ordinary dispersion optical fiber 30 is used. When a short optical pulse (optical frequency $v_0$) is input into the ordinary dispersion optical fiber 30, a pulse spectrum having linear chirping as shown in FIG. 9B is generated by the combined effects of self phase modulation and the dispersion. As a result, the control optical pulse having long time-width and linear chirping as shown in FIG. 9C is generated. This is based on the same principal as the pulse compression method for generating short optical pulse (G. P. Agrawal, "Nonlinear Fiber Optics", chapter 6, Academic Press, 1989). However, to obtain a spectrum width of 200 nm using ordinary dispersion optical fiber 30 of 1 km in length, a short optical pulse that has a peak power of approximately 200 to 300 W and a pulse width in ps order is needed. Thus, in the present method, a required excitation power is approximately 100 times greater than the power required when using a white pulse.

In addition, the inclination of chirping is usually limited to "blue shifted" chirping (that is, the leading edge of the pulse shifts to longer wavelengths, the training edge of the pulse shifts to the shorter wavelengths). Furthermore, when "red shifted" chirping (wherein the shift is the reverse to that of "blue shifted" chirping) is needed, the dispersion is controlled using an additional optical fiber having anomalous dispersion. The present generation method can also generate a control optical pulse having linear chirping in arbitrary optical frequencies, by letting the center transmission wavelength of the wavelength tunable optical bandpass filter changes in the wavelength range generated.

In the first and second embodiments, it has been assumed that the polarization direction of the time-division-multiplexed optical signal pulse and the control optical pulse are coincident with the principal axes of nonlinear optical material 12. The case in which the polarization state of the time-division-multiplexed optical signal pulse has not been established will be explained as follows. Firstly, a nonlinear optical material 12 is used wherein the polarization dependence of the four-wave mixing effect is small, and the polarization dispersion is small enough to be neglected in comparison to the reciprocal of the bit rate of the signal. Furthermore, it is so adjusted that the intensities of the polarizations of the control optical pulse for two directions of the principal axes of the nonlinear optical material 12 are equal. In other words, generally, the principal axis of the polarization of the control optical pulse and the principal axes of the nonlinear optical material 12 are set at 45 degrees. Therefore, the time-division-multiplexed pulse demultiplexing operation that does not depend on the polarization state of the time-division-multiplexed optical signal pulse can be achieved.

Furthermore, when a nonlinear optical material 12 is used wherein the polarization dependence of four-wave mixing: effect and the polarization dispersion cannot be neglected, the structures which are described in the third, forth and fifth embodiments is utilized to realize the polarization-independent operation which does not depend on the polarization state of the optical signal pulse. Still more, it is not necessary for chirping to be linear, and it is sufficient that the optical frequency changes continually.

The Third Embodiment

Figure 10:
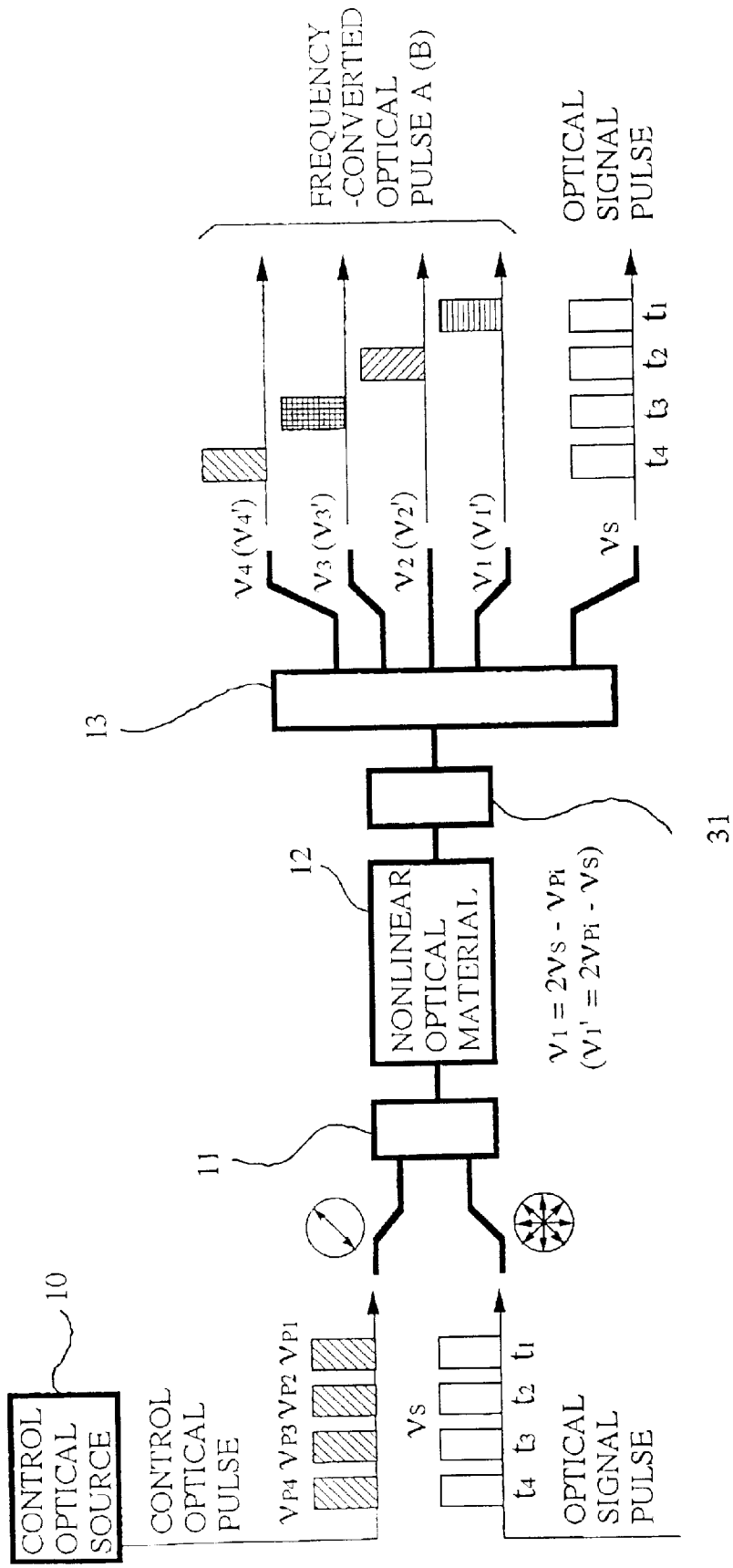
FIG. 10 shows an example of the structure of the third embodiment of the present invention.

FIG. 10 shows the structure of a multiple-channel all-optical TDM demultiplexer based on the third embodiment: of the present invention. In the present embodiment, an arrangement whereby four channels are simultaneously separated will be described. In FIG. 10, the time-division-multiplexed optical signal pulse train (optical frequency $v_s$) wherein TDM optical signal pulses and the control optical pulse train (optical frequency $v_{pi}$, i=1, 2, 3, and 4) are combined by the optical wavelength multiplexer 11 such that the optical pulses overlap in time, and input into nonlinear optical material 12.

Then, the intensities of the polarization components of the control optical pulse along the two principal axes of the nonlinear optical material 12 are set equal to each other, in other words, the relative angle between the principal axes of the nonlinear optical material 12 and the axis of polarization of the control optical pulse is set to be 45 degrees. In this way, the intensities of the polarization components along with two principal axes of the nonlinear optical material 12 are made equal.

The output of the nonlinear optical material 12 is input into the birefringence compensation means 31. The propagation time difference along the two principal axes of the nonlinear optical material 12 is compensated by the birefringence compensation means 31. Furthermore, the control optical pulse is used as the degenerate light in the four-wave mixing in the present embodiment. In this case, the conversion efficiency is determined by the control light intensity in each direction of polarization, and the loss, nonlinear refractive index, and the amount of phase mismatch of the nonlinear optical material. When these parameters are almost equal along the two principal axes, it is possible to ensure polarization-independent operation.

When the above parameters such as nonlinear refractive index and the amount of phase mismatch are different for each polarization, it is sufficient to adjust the control light polarization such that the conversion efficiencies ares made equal in each polarization direction. The output of the birefringence compensation means 31 is input into the single-input/multiple-output type optical wavelength demultiplexer 13, and is demultiplexed into the respective optical frequencies. Furthermore, in the present embodiment, it is possible to use the control optical source 26 shown in FIG. 6, and to input a chirped control optical pulse whose optical frequency is changed linearly in time and which has a fixed time-width.

Furthermore, the birefringence compensation means 31 is a linear material, so the birefringence compensation means 31 may be positioned anywhere that the control optical pulse train and the time-division-multiplexed optical signal pulse train pass, not limited to the position shown in FIG. 10. Also, since the time-division-multiplexed optical signal pulse train of optical frequency $v_s$ can be separated as in the first embodiment, it is possible to utilize this optical signal pulse train in the following stage.

Figure 11:
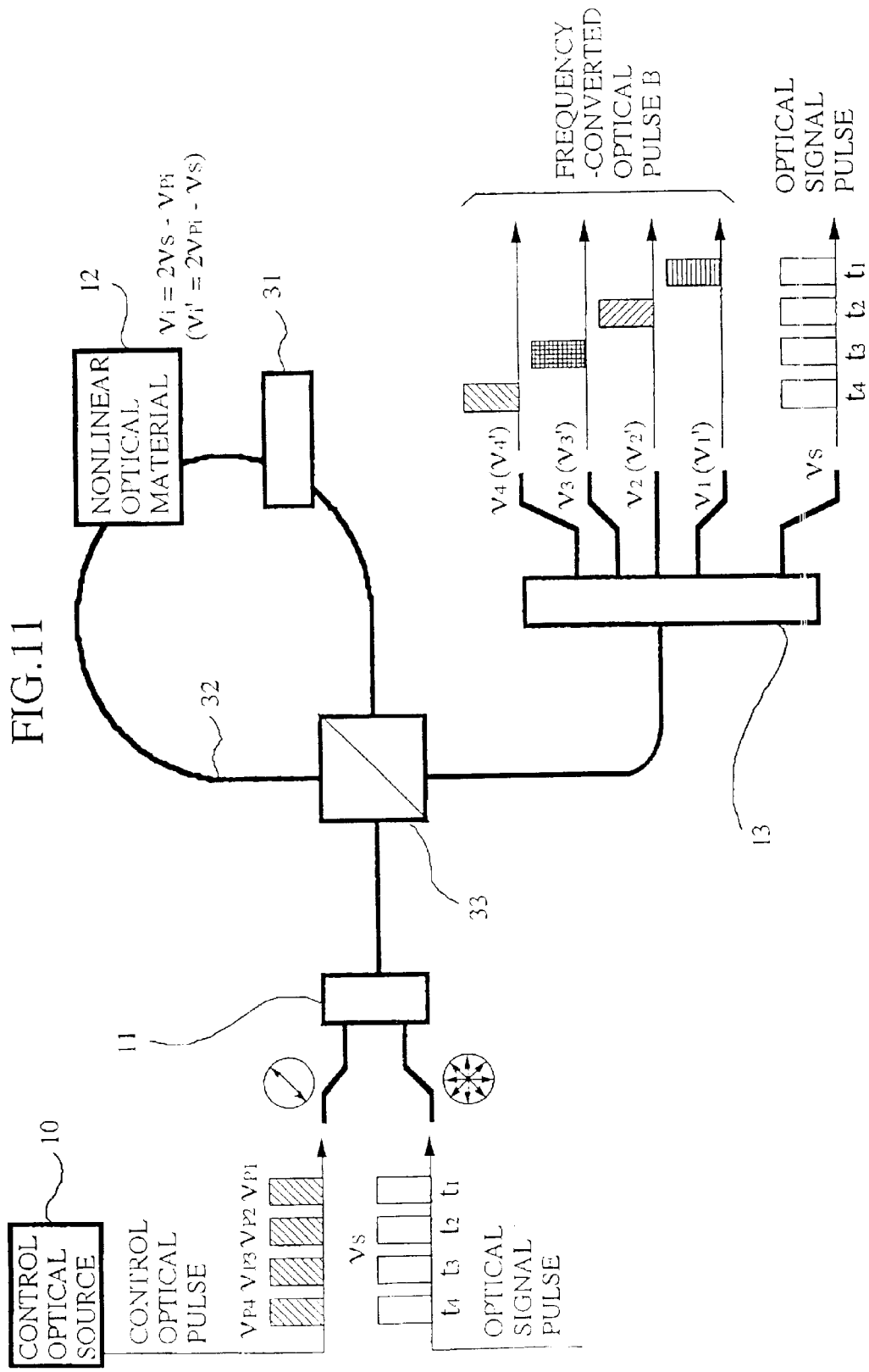
FIG. 11 shows another example of the structure of the third embodiment of the present invention.

A modified example of the present embodiment will be described, referring to FIG. 11. FIG. 11 shows a structural example of a modified example of the multiple-channel all-optical TDM demultiplexer based on the third embodiment of the present invention. This structure is different from the structure described above in that a polarization beam splitter 33 is arranged behind the optical wavelength multiplexer 11, and that a loop-shaped optical path 32 is formed by connecting the ends to which the two polarization components are output from the beam splitter 33, and that the nonlinear optical material 12 and the birefringence compensation means 31 are placed on this optical path 32, and that another end of the polarization beam splitter 33 is connected to the optical wavelength demultiplexer 13.

Then, the polarization axis of the control optical pulse is set at 45 degrees with respect to the principal axes of the polarization beam splitter 33, a vertical polarization component of the control optical pulse being input into one end of the optical pass 32 and a parallel polarization component being input into the other end with the same intensity as the vertical polarization. On the other hand, the optical signal pulse is input into the polarization beam splitter 33 in an arbitrary polarization state, and the two components are respectively input into one or the other end of the optical path 32 at a splitting ratio dependent on the polarization state. The optical path 32 is arranged in the form of a loop where one component of light propagates clockwise while the other component propagates counterclockwise. The clockwise light and the counterclockwise light in the optical path 32 are respectively input into the nonlinear optical material 12 inserted in the optical path 32.

When the control optical pulse is degenerate, a polarization-independent operation can be performed because the conversion efficiency of four-wave mixing is equal in the clockwise and counterclockwise directions. Generally, birefringence causes a time delay difference between the light traveling in either direction because the clockwise light and the counterclockwise light propagate along different polarization axes. It is possible to compensate for the time delay difference by inserting a birefringence compensation means 31 in the loop as shown in FIG. 11. The clockwise light and the counterclockwise light that return to the polarization beam splitter 33 are respectively reflected and transmitted, then output from the fourth port.

In the above description, the polarization dependence on properties such as nonlinear refractive index, dispersion (the amount of phase mismatch), and loss of the nonlinear optical material, which determines the conversion efficiency of the four-wave mixing, has been ignored. However, the polarization dependence is slightly different in either polarization in a real nonlinear optical material. Therefore, in order to achieve the polarization-independent operation of the all-optical TDM demultiplexer, the conversion efficiency of four-wave mixing in each direction must be made equal by adjusting the intensities of each component of the control optical pulse.

For this purpose, the angle between the polarization axis of the control light which is input into polarization beam splitter 33 and the principal axis of the polarization beam splitter adjusted to be slightly off 45 degrees. Furthermore, as is clear in FIG. 11, it is possible to arrange the birefringence compensation means 16 in front of the polarization beam splitter 33 or the optical wavelength demultiplexer 13.

The Fourth Embodiment

Figure 12:
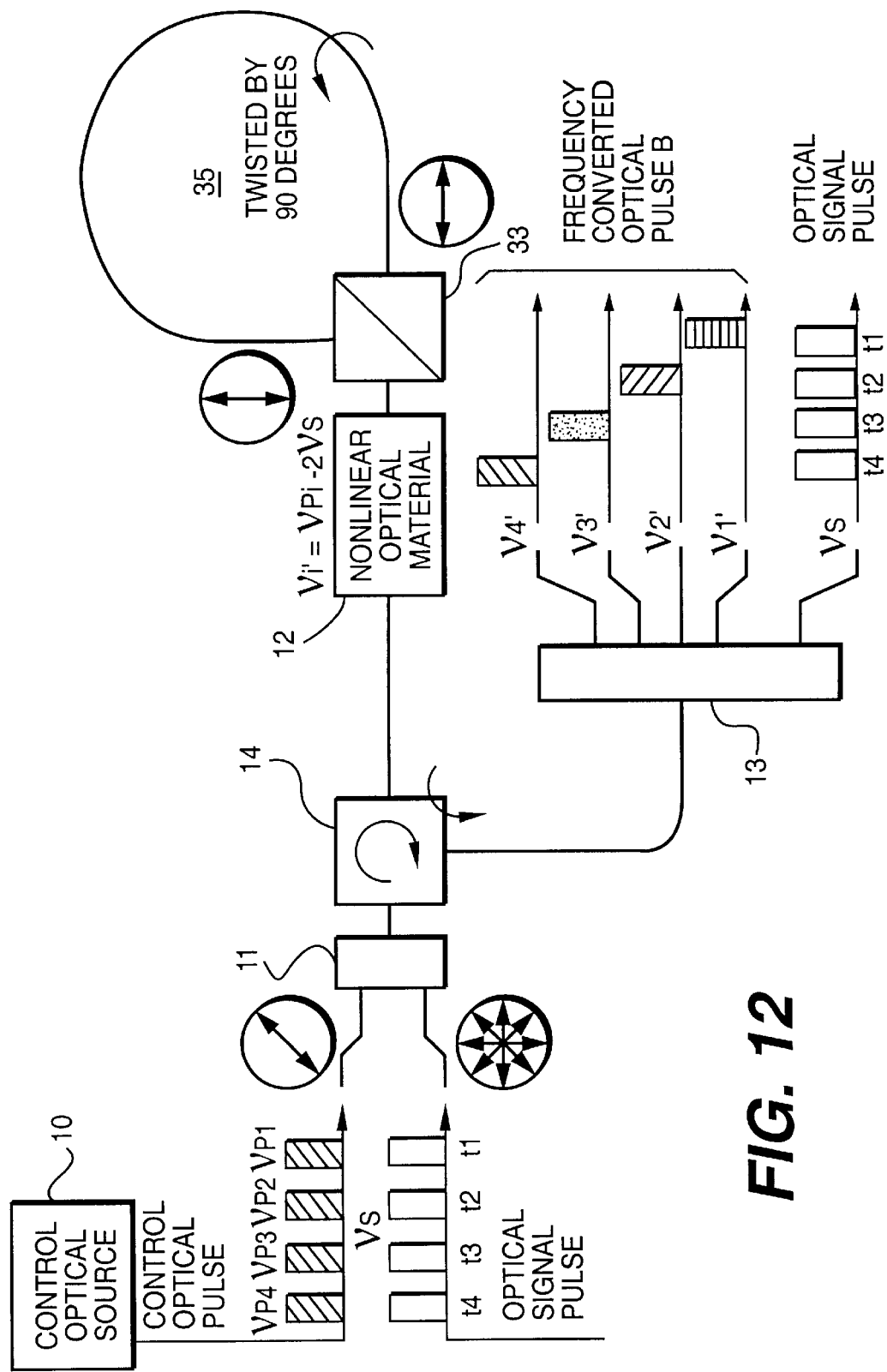
FIG. 12 shows an example of the structure of the fourth embodiment of the present invention.

FIG. 12 shows the structure of a multiple-channel all-optical TDM demultiplexer based on the fourth embodiment of the present invention. In the present embodiment, an arrangement whereby four channels are simultaneously separated will be described. In FIG. 12, the time-division-multiplexed optical signal pulse train (optical frequency $v_s$) and the control optical pulse train (optical frequency $v_{pi}$, i=1, 2, 3, and 4) are combined by the optical wavelength multiplexer 11 such that each optical pulse overlaps in time, and are input to the nonlinear optical material 12 via optical circulator 14.

The output of the nonlinear optical material 12 is reflected by polarization rotation mirror 35, and is input into the nonlinear optical material 12 again. The output of nonlinear optical material 12 is input into a single-input and multiple-output type optical wavelength demultiplexer 13 via optical circulator 14, and is demultiplexed into the respective optical frequencies. The polarization rotation mirrors 35 are constituted by polarization beam splitter 33 and loop-wise polarization-maintainingoptical fiber 34 which is twisted by 90 degrees (T. Morioka et al. "Ultrafast reflective optical Kerr demultiplexer using polarization rotation mirror", Elect. Lett., vol. 28, no. 6, pp. 521–522, 1992).

The optical signal pulse (optical frequency $v_s$) is input into the nonlinear optical material 12 with arbitrary polarization. Furthermore, the control optical pulse (optical frequency $v_{pi}$) is input into the nonlinear optical material 12 at a specified polarization of 45 degrees to the principal axes of the nonlinear optical material 12. For this reason, the intensity of the polarization components in the two directions of the principal axes of the nonlinear optical material 12 coincide with each other.

In the present structure, the optical signal pulse and the control optical pulse which pass through the nonlinear optical material 12 are input into the polarization rotation mirror, in which, each polarization is rotated by 90 degrees, and input to the nonlinear material again. The optical signal pulse and the control optical pulse enter the nonlinear optical material 12 twice.

Because the polarizations are rotated by 90 degrees in the entering part and the returning part, in other words, because the polarization component of the vertical director is replaced with the polarization component of the parallel direction, the polarization dispersion is completely compensated for in the output from the returning part, and two polarization components of the time-division-multiplexed optical signal pulse and the control optical pulse coincide with in time.

In the present embodiment, the control optical pulse is made degenerative for four-wave mixing. Therefore, it is possible to ensure polarization-independent operation. Frequency-converted optical pulse train B output from the nonlinear optical material 12 is brought to the optical wavelength demultiplexer 13 via the optical circulator 14. In the optical wavelength demultiplexer 13, the frequency-converted optical pulse train B is separated into four channels simultaneously.

Because the time-division-multiplexed optical signal pulse train of optical frequency $v_s$ can also be separated in the same way as in the first embodiment, it is possible to utilize this optical signal pulse train in the following stage circuit. Furthermore, it is possible to use optical couplers instead of the optical circulator 14 and to output a portion of the output of the nonlinear optical material 12 into the optical wavelength demultiplexer 13. Furthermore, in the present embodiment, it is possible to use the control optical source 26 shown in FIG. 6, and to input the control optical pulse which is chirped so that the optical frequency is changed linearly in time and which has a fixed time-width.

The Fifth Embodiment

Figure 13:
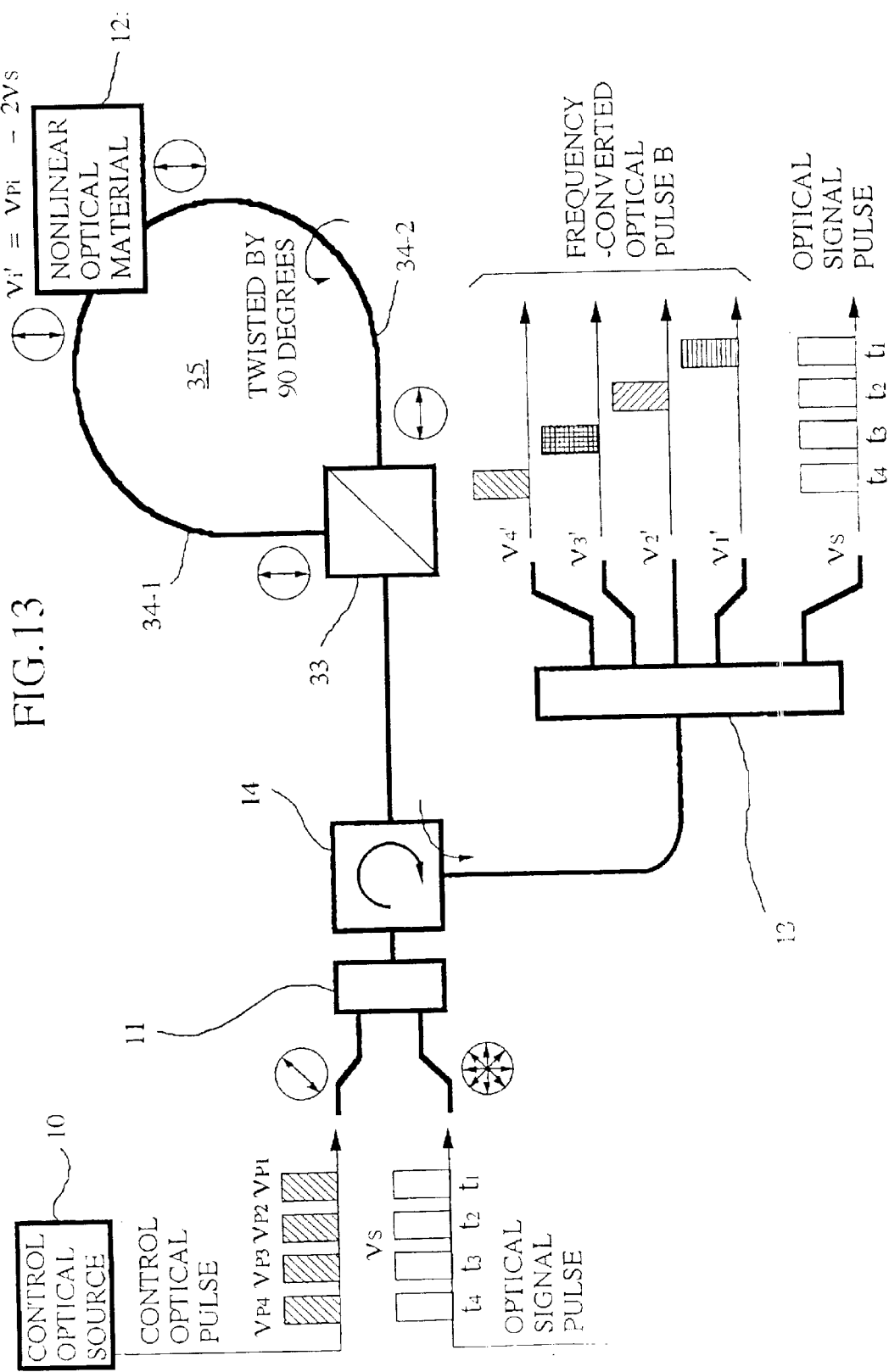
FIG. 13 shows an example of the structure of the fifth embodiment of the present invention.
Figure 14:
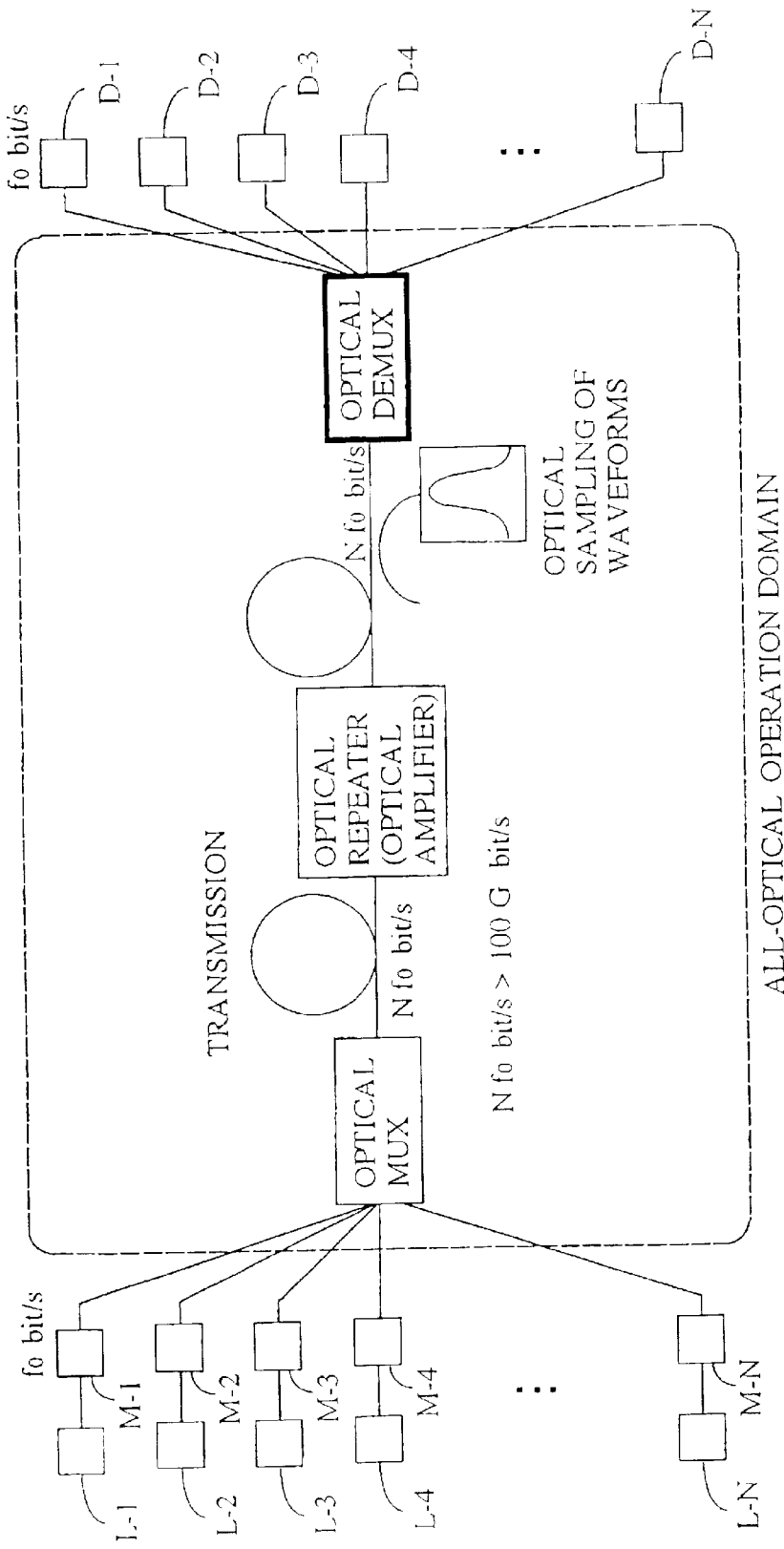
FIG. 14 shows an example of the structure of a future optical communication system.
Figure 15:
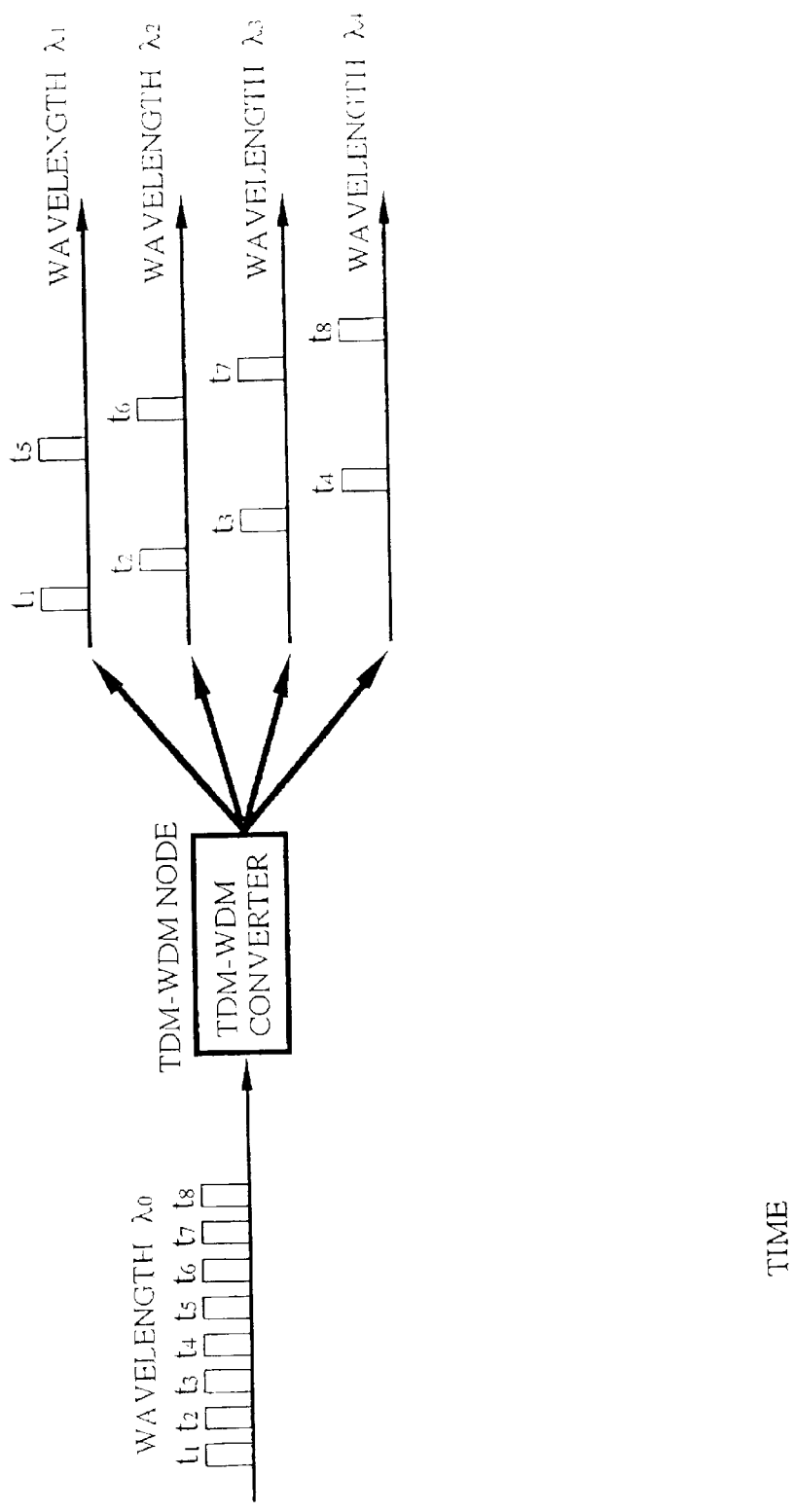
FIG. 15 describes the role of a TDM-WDM converter.
Figure 16:
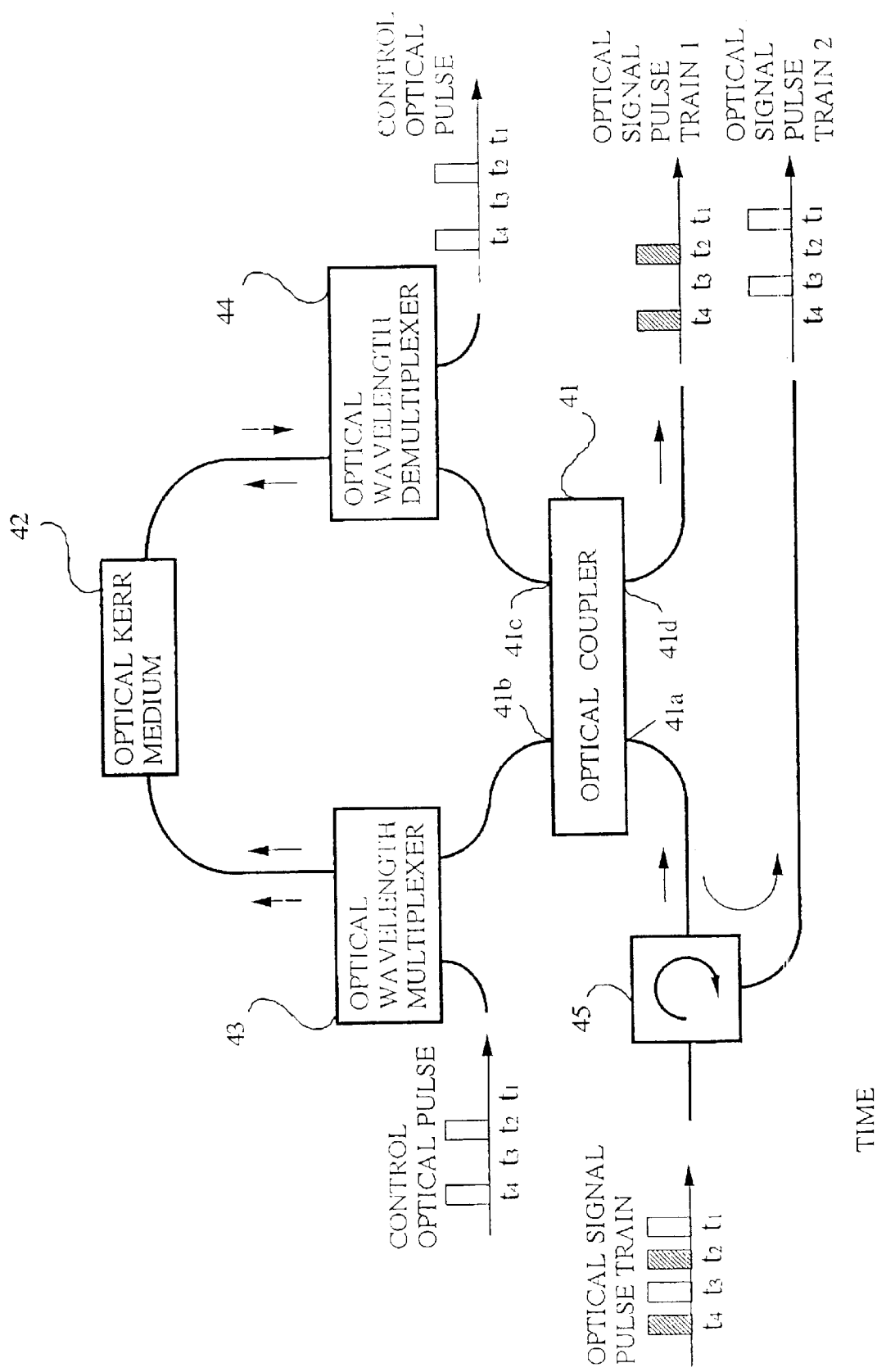
FIG. 16 shows an example of the structure of a conventional TDM demultiplexer.
Figure 18A:
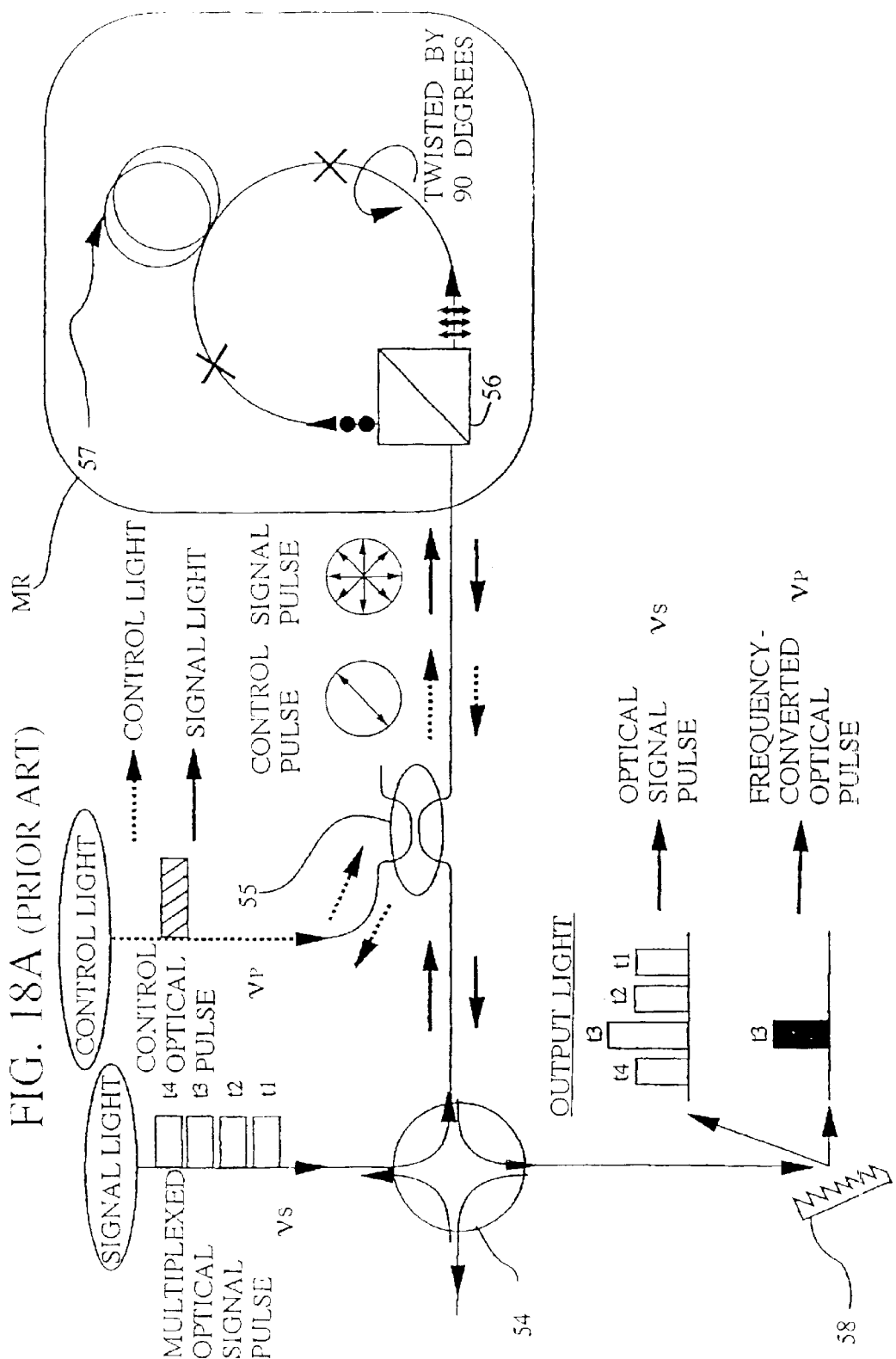
FIG. 18A shows an example of the structure of a conventional polarization-independent type TDM demultiplexer using the four-wave mixing effect.
Figure 18B:
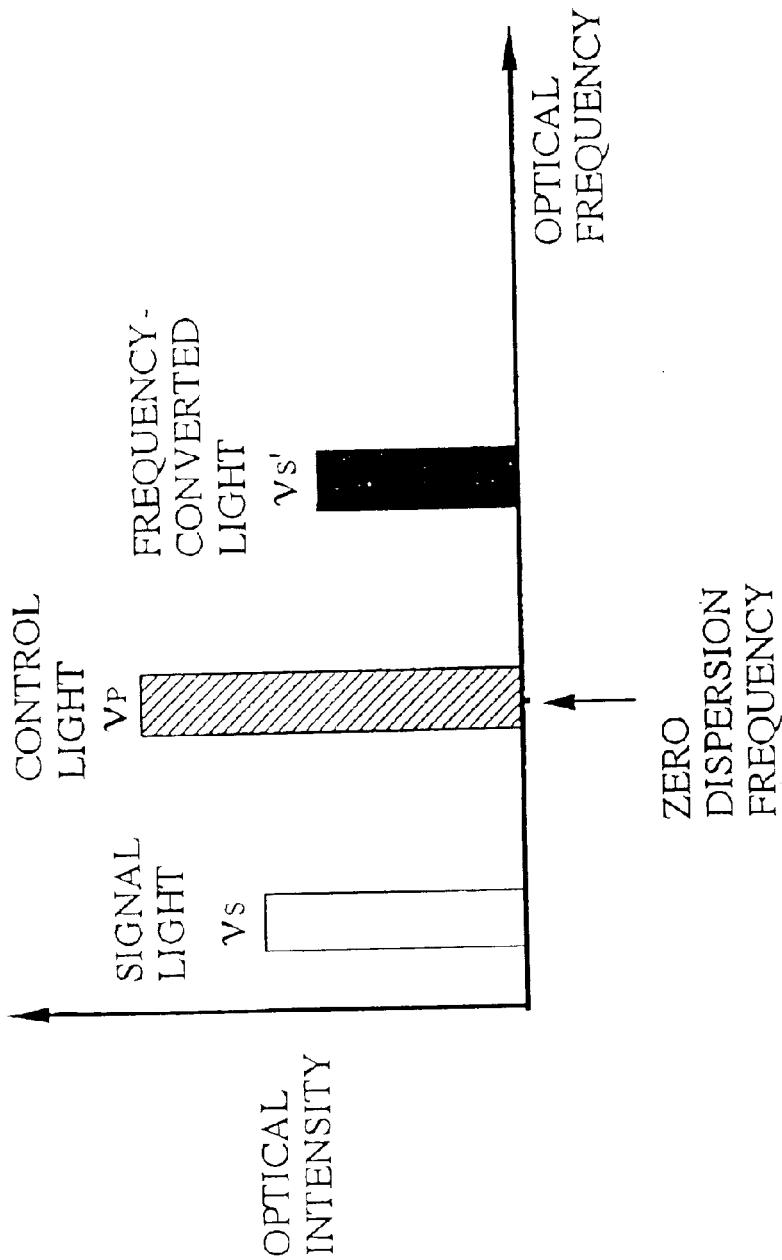
FIG. 18B shows an example of the four-wave mixing effect utilized in an example shown in FIG. 18A.
Figure 19:
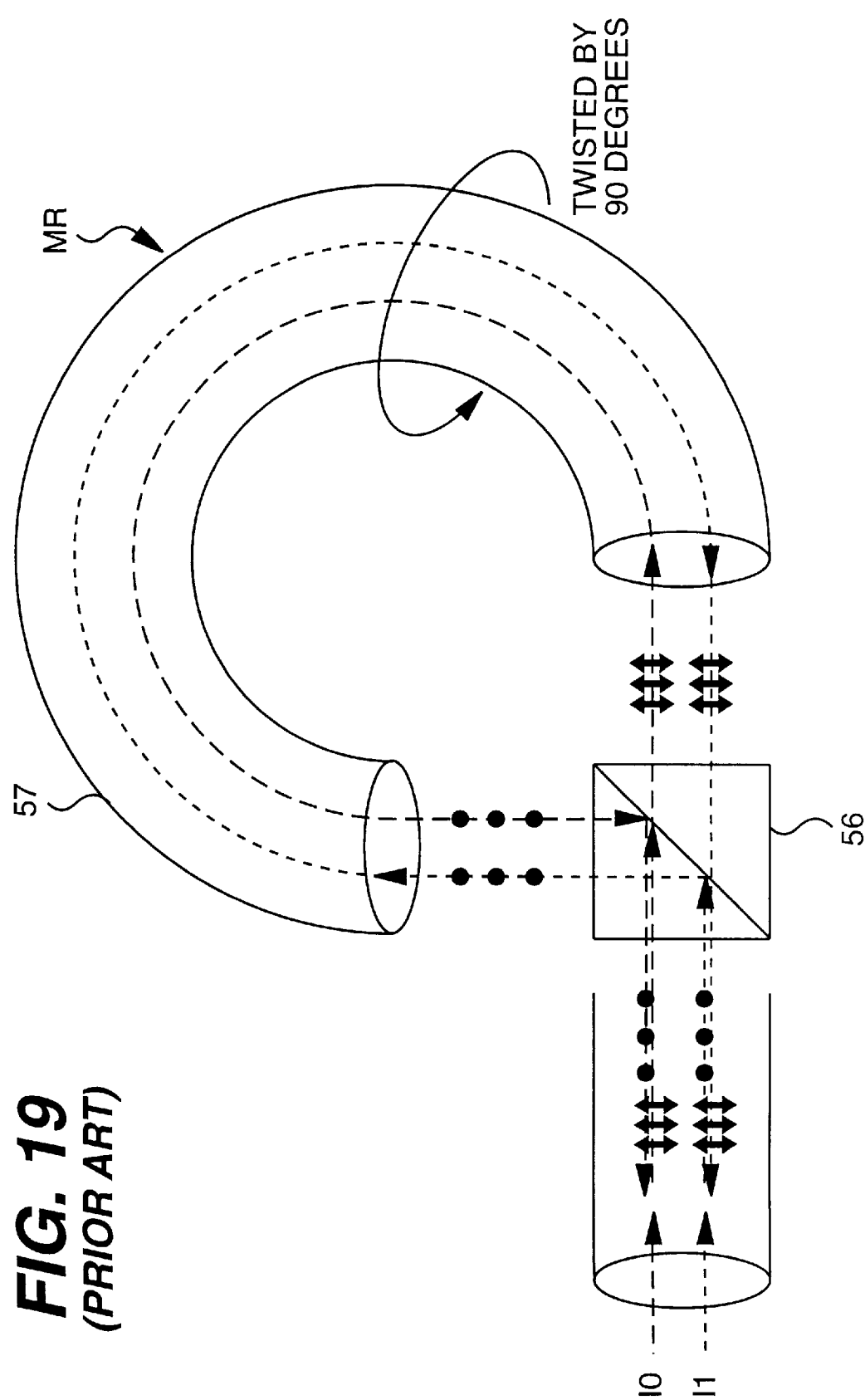
FIG. 19 shows an example of the structure of the polarization rotation mirror.

FIG. 13 shows the structure of the fifth embodiment of the present invention. In the present embodiment, a structure for separating four channels will be described. In FIG. 13, the time-division-multiplexed optical signal pulse train (optical frequency $v_s$) and the control optical pulse train (optical frequency $v_{pi}$, i=1, 2, 3, and 4) are combined by optical wavelength multiplexer 11 in such a way that each optical pulse overlaps in time, and are input into the polarization beam splitter 33 via optical circulator 14.

The polarization component output from the polarization beam splitter 33 along the principal axis of the nonlinear optical material 12 is connected to one end of the nonlinear optical material 12 via the polarization-maintaining optical fiber 34-1, and the polarization component which is perpendicular to the principal axis of the nonlinear optical material 12 is connected to the other end of the nonlinear optical material 12 via the polarization-maintaining optical fiber 34-2 which has been twisted by 90 degrees.

The polarization beam splitter 33 and the nonlinear optical material 12 are connected to each other in a loop by means of the polarization-maintainingoptical fibers 34-1, 34-2 with their principal axes aligned. When using an open-air optical transmission configuration for connecting the polarization beam splitter 33 and the nonlinear optical material 12, a polarization rotation element for rotating the polarization 90 degrees is used instead of a polarization-maintainingoptical fiber 34-2 twisted by 90 degrees. The output of the polarization beam splitter 33 is input into the single-input/multiple-output type optical wavelength demultiplexer 13 via the optical circulator 14, and is demultiplexed into each optical frequency. With regards to the input polarization state, the time-division-multiplexed optical signal pulse (optical frequency $v_s$) is input into the nonlinear optical material 12 with an arbitrary polarization. Furthermore, the control optical pulse (optical frequency $v_{pi}$) is separated into each polarization component by the polarization beam splitter 33, and is input into the nonlinear optical material 12 such that the intensities of each polarization component at both input ends of the nonlinear optical material 12 are identical (usually, the principal axis of polarization makes a 45 degree angle with respect to the principal axes of the nonlinear optical material 12). In other words, in the polarization beam splitter 33, the control optical pulse is divided into clockwise and counterclockwise component at a one to one optical intensity ratio, and, the time-division-multiplexed optical signal pulse is divided at an arbitrary ratio depending on the polarization state.

On the other hand, because the polarization-maintaining optical fiber 34-1, 34-2 and the nonlinear optical material 12 are connected so that their principal axes coincide, the clockwise and counterclockwise components are input into the in nonlinear optical material 12 with the same polarization. Since the phase matching conditions are identical in each direction, the conversion efficiency depends only on the optical intensity of the control optical pulse in the case the control optical pulse is degenerative for four-wave mixing.

Therefore, in the nonlinear optical material 12, the sum of the optical intensities of the frequency-converted optical pulse train B of optical frequencies $v_i'$ ($=2v_{pi}-v_s$, i=1, 2, 3, and 4) for optical signal pulses input from both directions does not depend on the polarization state of the input time-division-multiplexed optical signal pulse train, and stays constant. Therefore, a frequency-converted optical pulse train B, which is stable and does not depend on the polarization of the time-division multiplexed optical signal pulse is provided as the output of the polarization beam splitter 33, and polarization independent operation is achieved, The frequency-converted optical pulse train B output from the polarization beam splitter 33 is sent to the optical wavelength demultiplexer 13 via the optical circulator 14. In the optical wavelength demultiplexer 13, it is possible to simultaneously separate the frequency-converted optical pulse train B into four channels by wavelength demultiplexing this frequency-converted optical pulse train B into the optical frequencies $v_1'$ to $v4'$.

Because the time-division-multiplexed optical signal pulse train of optical frequency $v_s$ can also be separated as in the first embodiment, it is possible to utilize this optical signal pulse train in the following stage circuit. Furthermore, it is possible to use optical couplers instead of the optical circulator 14 and to output a portion of output of the polarization beam splitter 33 into the optical wavelength demultiplexer 13. Furthermore, in the present embodiment, it is possible to use the control optical source 26 shown in FIG. 6, and to input a control optical pulse which is chirped so that its optical frequency is changed linearly in time series which has fixed time-width.

The above-described embodiments happen to describe separation into four channels; however, it is possible to simultaneously separate more channels by using a control optical pulse train having more optical frequencies or having wider band width and pulse width. Specifically, when the bit rate of the time-division-multiplexed optical signal is set at 200 Gbit/s, the band width of each optical signal pulse will be approximately 1 nm. Therefore, it is necessary that the frequency interval between channels after conversion be at least one nm, when taking into consideration the performance of the optical wavelength demultiplexer and the suppression of the crosstalk between channels.

Therefore, a band having 1 nm * 10 * 2=20 nm is required to separate 10 channels simultaneously. Incidentally, as a nonlinear optical material, one of which the efficiency for four-wave mixing does not significantly change over a wide band is desirable. When using a normal polarization-maintaining optical fiber, a three dB band width of efficiency for four-wave mixing is approximately 14 nm, making it possible to simultaneously separate six to seven channels. Furthermore, when using a semiconductor laser amplifier, a three dB band width is approximately 26 nm wide due to the four-wave mixing based on spectral hole burning, making it possible to simultaneously separate twelve to thirteen channels (K. Kikuchi et al., "Analysis of origin of nonlinear gain in 1.5 μm semiconductor active layers by highly nondegenerate four-wave mixing", Appl. Phys. Lett., vol.64, pp.548–550, 1994).

What is claimed is:

1. A multiple-channel all-optical TDM-WDM converter and multiple-channel all-optical TDM demultiplexer comprising:

a control optical source for generating a control optical pulse train containing N different optical frequencies, all of which are lower or higher than a frequency of a time-division-multiplexed optical signal pulse train, wherein N is an integer greater than or equal to 2, at a timing which is synchronous with optical signal pulse trains of N channels which are to be separated from said time-division-multiplexed optical signal pulse train;

an optical wavelength multiplexing means which combines said time-division-multiplexed optical signal pulse train and said control optical pulse train;

a nonlinear optical material for inputting light output from said optical wavelength multiplexing means, inducing a four-wave mixing effect between said optical signal pulse trains of N channels and said control optical pulse train containing N optical frequencies, and outputting a frequency-converted optical pulse train wherein N types of optical pulse trains having different optical frequencies are mixed; and an optical wavelength demultiplexing means for spatially separating said N types of optical pulse trains from said frequency-converted optical pulse train according to each of said N optical frequencies.

2. A multiple-channel all-optical TDM-WDM converter and multiple-channel all-optical TDN demultiplexer as claimed in claim 1, wherein said control optical source generates an control optical pulse train in which an optical frequency monotonically-changes in time series.

3. The multiple-channel all-optical TDM-WDM converter and multiple-channel all-optical TDM demultiplexer as claimed in either claim 1 or 2, wherein said control optical source comprises:

wide band pulse generation means for receiving a short optical pulse and for outputting a wide band optical pulse which contains optical frequency of said short optical pulse;

an optical wavelength demultiplexer for demultiplexing said wide band optical pulse output from said wide band pulse generation means into N wavelength components;

N optical wavelength selection and delay means for selecting different optical frequency components output from said optical wavelength demultiplexer and for delaying each of said optical frequency components by a different time; and an optical coupling device for combining the outputs of said N optical wavelength selection delay means.

4. A multiple-channel all-optical TDM-WDM converter and multiple-channel all-optical TDM demultiplexer as claimed in claim 1, wherein said control optical source generates an control optical pulse train with chirping, wherein an optical frequency changes continuously in time series, and a time width contains optical signal pulse trains of N channels.

5. A multiple-channel all-optical TDM-WDM converter and multiple-channel all-optical TDM demultiplexer as claimed in any one of claims 1, 2 or 4, further comprising a birefringence compensation means which compensates for a propagation group delay difference produced between two principal axes of said nonlinear optical material, placed between said optical wavelength multiplexing means and said optical wavelength demultiplexing means.

6. A multiple-channel all-optical TDM-WDM converter and multiple-channel all-optical TDM demultiplexer as claimed in any one of claims 1, 2 or 4 wherein said control optical source generates an control optical pulse train polarized in a direction in which the conversion efficiencies for four-waves mixing in the two principal axes of said nonlinear optical material are equal, and further comprising:

a polarization rotation mirror for rotating both polarization components of light output from said nonlinear optical material by an angle of 90 degrees and reintroducing the rotated light into said nonlinear optical material;

an optical dividing means for sending light output from said optical wavelength multiplexing means to said nonlinear optical material, and for sending a part or all of light output from said nonlinear optical material to said optical wavelength demultiplexing means.

7. A multiple-channel all-optical TDM-WDM converter and multiple-channel all-optical TDM demultiplexer as claimed in any one of claims 1, 2 or 4 further comprising:

a polarization beam splitter for separating light output from said optical wavelength multiplexing means into two polarization components polarized in the directions of the principal axes of said nonlinear optical material;

an optical connecting means forming a loop which connects said polarization beam splitter and said nonlinear optical material, wherein one of said two polarization components is input to one end of said nonlinear optical material along the principal axes of said nonlinear optical material and the other of said two polarization components is input after undergoing a polarization rotation of 90 degrees to another end of said nonlinear optical material;

an optical dividing means for sending light along the principal axes of said nonlinear optical materials output from said optical wavelength multiplexing means into said polarization beam splitter and for sending a part or all of light output from said polarization beam splitter to said optical wavelength demultiplexing means.

8. A multiple-channel all-optical TDM-WDM converter and multiple-channel all-optical TDM demultiplexer as claimed in any one of claims 1, 2 or 4, wherein said time-division-multiplexed optical signal pulse train consists of only polarization components in the direction of one of two principal axes of said nonlinear optical material, and said control optical pulse train consists of only polarization components in a direction identical to that of the polarization components of said time-division-multiplexed optical signal pulse train.

9. The multiple-channel all-optical TDM-WDM converter and multiple-channel all-optical TDM demultiplexer as claimed in claim 8, wherein said control optical source comprises:

wide band pulse generation means for receiving a short optical pulse and for outputting a wide band optical pulse which contains optical frequency of said short optical pulse;

chirping means for chirping the wide band optical pulse output from said wide band pulse generation means; and an optical bandpass filter for filtering pulses output from said chirping means.

10. A multiple-channel all-optical TDM-WDM converter and multiple-channel all-optical TDM demultiplexer as claimed in claim 4, wherein said control optical source comprises a nonlinear dispersive material having ordinary dispersion for outputting wide band chirped optical pulses with optical frequencies of input short optical pulses.

* * * * *